(12) United States Patent
Nuggehalli et al.

(10) Patent No.: US 8,446,621 B2
(45) Date of Patent: May 21, 2013

(54) SYSTEM, METHOD AND APPARATUS USING A LOCKED PRINT JOB TICKET

(75) Inventors: Jayasimha Nuggehalli, Cupertino, CA (US); Tomoki Hattori, Duluth, GA (US)

(73) Assignee: Ricoh Company, Ltd., Tokyo (JP)

( * ) Notice: Subject to any disclaimer, the term of this patent is extended or adjusted under 35 U.S.C. 154(b) by 746 days.

(21) Appl. No.: 12/465,669

(22) Filed: May 14, 2009

(65) Prior Publication Data

US 2010/0290073 A1 Nov. 18, 2010

(51) Int. Cl.
*G06F 3/12* (2006.01)
*G06F 7/04* (2006.01)
*G06K 15/00* (2006.01)
*H04N 1/00* (2006.01)
*H04N 7/16* (2011.01)

(52) U.S. Cl.
USPC ......... 358/1.15; 358/1.14; 358/402; 358/403; 726/4; 340/5.8

(58) Field of Classification Search
None
See application file for complete search history.

(56) References Cited

U.S. PATENT DOCUMENTS

| 7,249,900 | B1 | 7/2007 | Katano et al. | |
| 2002/0041394 | A1* | 4/2002 | Aoki | 358/1.15 |
| 2002/0085228 | A1* | 7/2002 | Yagita | 358/1.15 |
| 2007/0008581 | A1* | 1/2007 | Han | 358/1.15 |

OTHER PUBLICATIONS

U.S. Appl. No. 12/504,390, filed Jul. 16, 2009, Nuggehalli, et al.
U.S. Appl. No. 12/388,238, filed Feb. 18, 2009, Hanaoka, et al.

* cited by examiner

*Primary Examiner* — Thomas Lett
(74) *Attorney, Agent, or Firm* — Oblon, Spivak, McClelland, Maier & Neustadt, L.L.P.

(57) ABSTRACT

A method, apparatus, and system for outputting a locked print job by a printing device connected to a client device over a network. The method includes transmitting, by the client device, a request to print the locked print job, which includes print data that is prohibited from being printed until authentication information is entered into the printing device. The printing device receives the request to print the locked print job. The locked print job and the authentication information are stored in a memory. A job ticket that provides the client device access to manage the locked print job stored in the memory is generated. The job ticket is transmitted to, and received by, the client device. The locked print job is output when the authentication information is entered into the printing device or the locked print job is remotely released by the client device using the job ticket.

20 Claims, 23 Drawing Sheets

| | Job Name | Page | Date/Time | |
|---|---|---|---|---|
| | [X] paul - xl_auto.doc | 0001 | Fri Sep 15 11:18:31 2006 | Exit |
| | [X] paul 5eauto | 0001 | Fri Sep 15 11:18:32 2006 | |
| | [X] paul ps_auto.doc | 0001 | Fri Sep 15 11:18:33 2006 | |
| User ID: paul Total: 3 jobs 1/1 Previous Next | | | | Print Delete Deselect All |
| | | System Status | Job List | SEP 15, 2006 11:52 AM |

*Fig. 17C*

| Job Table | |
|---|---|
| PK | Job ID |
| | User ID Password Time Stamp Job Name Page Count Print Count |

*Fig. 18*

SYSTEM, METHOD AND APPARATUS USING A LOCKED PRINT JOB TICKET

BACKGROUND OF THE INVENTION

1. Field of the Invention

The present invention relates generally to locked print jobs. The present invention is more particularly related to a locked print job ticket corresponding to a locked print job.

2. Description of the Related Art

In environments such as an office or computer lab, computers may be connected to one or more printers shared over a network. To print a document, a computer user typically transmits a request to print the document to one of the shared printers. The shared printer prints the document, in response to the print request, and the computer user retrieves the printed document from the shared printer.

However, in such environments, it is difficult to maintain confidentiality of the printed document. For example, it is difficult to prevent other users from viewing the printed document between the time the document is printed by the printer and when the printed document is retrieved by the computer user.

Accordingly, a printing device may be configured to require that a password be entered, before the printing device permits the document to be printed. FIG. 1 illustrates an approach for implementing locked printing on a printing device, as disclosed in U.S. Pat. No. 7,249,900, which is incorporated by reference in its entirety. As illustrated in FIG. 1, locked printing is initiated by a user at a client device in step S2. The user specifies a user ID and password data corresponding to the locked printing. Next, print data is generated and transmitted to the printing device in steps S4 and S6, respectively. In the printing device, the print data is processed by a locked print process in step S8, and stored on the printing device if locked printing is specified in step S10. Then, the user accesses the printing device and selects the locked printing option in step S12. The user selects the user ID and enters the corresponding password data in step S14. When the password data is authenticated in step S16, a list of print data associated with the authenticated user ID/password pair is presented in step S18. The user may select one of or more of the listed print data and perform an action (e.g., print or delete) in step S20.

However, if the user wants to act on the locked print job, the user must walk up to the machine, input his/her password, select the required job, and perform an action for the locked print job by pressing hard keys or touch panels on the printing device. Thus, the user cannot conveniently perform an action on the locked print job (e.g., print or delete the print job).

SUMMARY OF THE INVENTION

According to an embodiment of the present invention, a method is provided for outputting a locked print job by a printing device connected to a client device over a network. The method includes transmitting, by the client device, a request to print the locked print job. The locked print job includes print data that is prohibited from being printed until authentication information is entered into the printing device. The printing device receives the request to print the locked print job transmitted by the client device. The locked print job and the authentication information are stored in a memory. The authentication information is configured to unlock the locked print job when entered into the printing device. The printing device generates a job ticket that provides the client device access to manage the locked print job stored in the memory. The generated job ticket is transmitted to, and received by, the client device. The method further includes outputting, by the printing device, the locked print job, when the authentication information is entered into the printing device or the locked print job is remotely released by the client device using the job ticket.

Further, according to another embodiment of the present invention, there is provided a method of a printing device for outputting a locked print job. The method includes receiving, by the printing device, a request to print the locked print job. The locked print job includes print data that is prohibited from being printed until authentication information is entered into the printing device. The locked print job and the authentication information are stored in a memory. The authentication information is configured to unlock the locked print job when entered into the printing device. A job ticket that provides a client device access to manage the locked print job stored in the memory is generated. The generated job ticket is transmitted to the client device. The method further includes outputting, by the printing device, the locked print job, when the authentication information is entered into the printing device or the locked print job is remotely released by the client device using the job ticket.

According to another embodiment of the invention, there is provided a printing device. The printing device includes means for receiving a request to print a locked print job, the locked print job including print data that is prohibited from being printed until authentication information is entered into the printing device; means for storing, in a memory, the locked print job and the authentication information, the authentication information being configured to unlock the locked print job when entered into the printing device; means for generating a job ticket that provides a client device access to manage the locked print job stored in the memory; means for transmitting the generated job ticket to the client device; and means for outputting the locked print job, when the authentication information is entered into the printing device or the locked print job is remotely released by the client device using the job ticket.

Further, according to another embodiment of the present invention, there is provided a computer-readable storage medium having instructions embedded therein, which, when executed by a processor, cause the processor to perform each of the methods of the printing device and the client device, respectively, as discussed above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 17A-17C are screenshots of exemplary interfaces for allowing a user to access the locked print job in the printing device; and FIG. 18 illustrates an exemplary locked print job database schema.

DETAILED DESCRIPTION OF THE PREFERRED EMBODIMENTS

Figure 1:
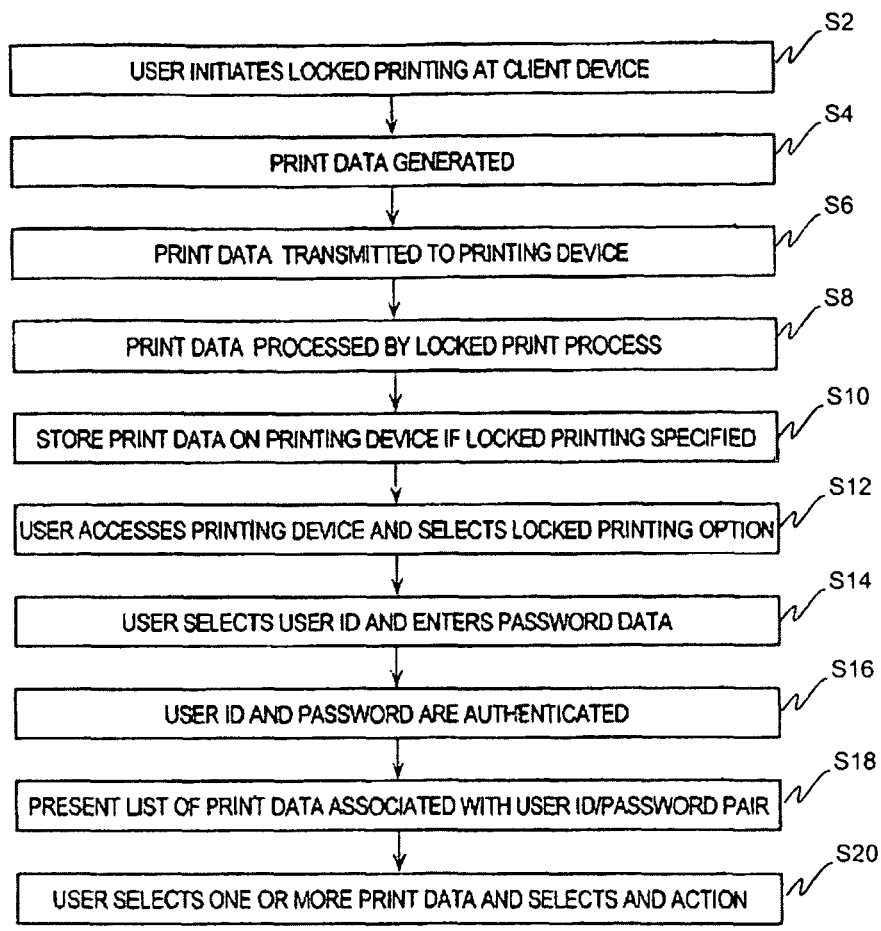
FIG. 1 illustrates a flow diagram for a locked print process.
Figure 2:
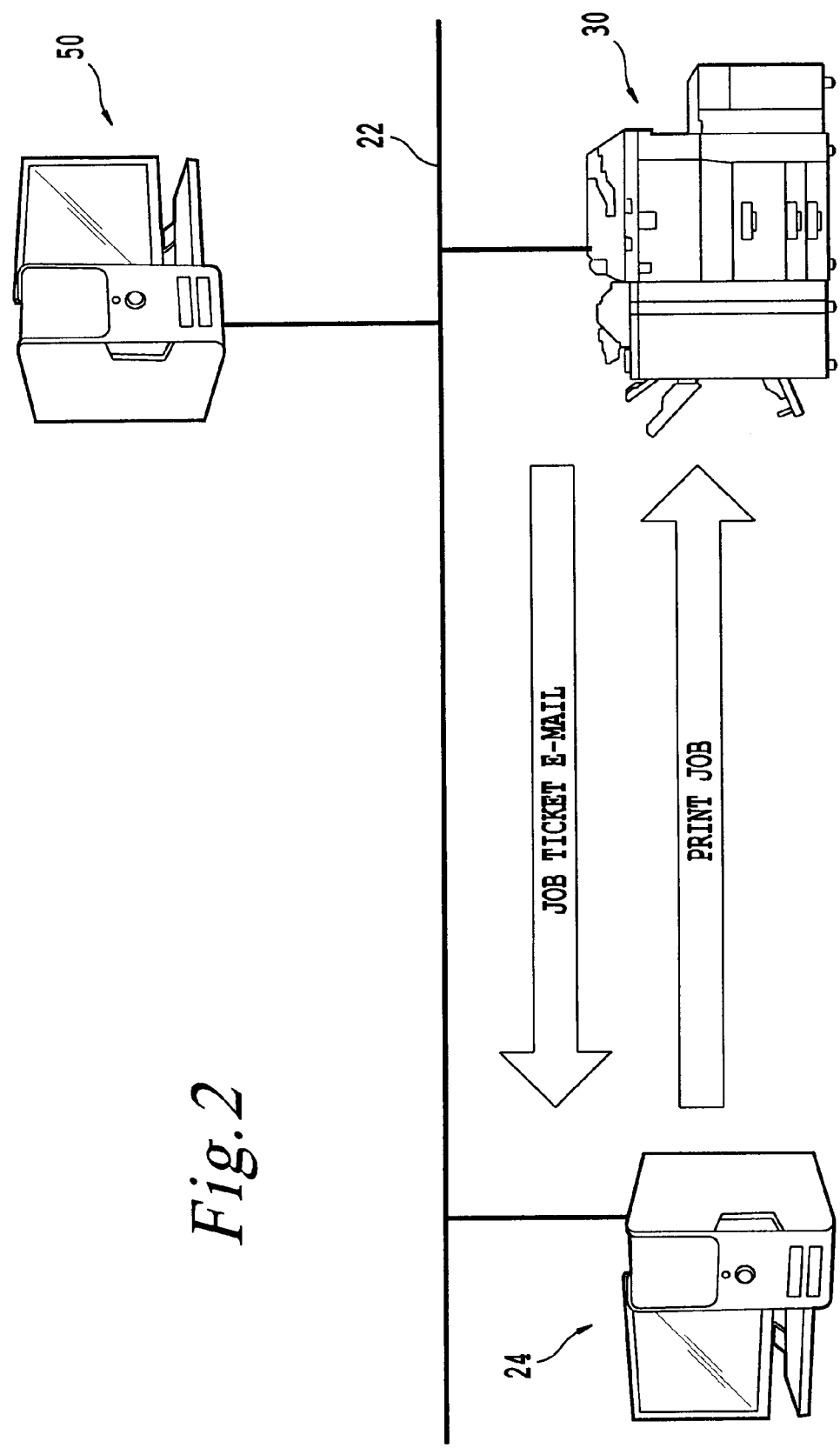
FIG. 2 illustrates an exemplary locked printing system including a client device, a printing device, and an e-mail server.

Referring now to the drawings, wherein like reference numerals designate identical or corresponding parts throughout the several views, FIG. 2 is a block diagram that shows an exemplary locked printing system including a client device 24, a printing device 30, and an e-mail server 50 connected to each other over a network 22. As illustrated in FIG. 2, a user using the client device 24 sends a locked or an unlocked print job to the printing device 30 over the network 22.

In one embodiment, when the user sends the print job to the printing device 30, an Enhanced Locked Print (ELP) print job filter parses the print job and, if it is identified as a locked print job, stores the print job in the printing device 30 (e.g., in a hard disk drive). Otherwise, the print job is printed out by the printing device 30. Once the ELP print job filter identifies and stores the locked print job, it also creates a job ticket, which is sent in an e-mail via the e-mail server 50 to the user who sent the print job. However, in other embodiments, the job ticket may be sent to any other designated user. Further, the job ticket may be sent via other communication methods including, but not limited to, instant messaging (IM), text messaging, a personal web page, or the like. Using the arrangement of FIG. 2, the user can manage the locked print job, as further discussed below.

The job ticket enables the user to confirm reception of the requested print job by the printing device, to release a stored print job from a remote workstation (e.g., client device 24) instead of walking up to the printing device 30, to release the stored print job remotely and to modify print parameters (e.g., duplex or color), and to obtain a cost estimate for printing the print job.

Figure 3:
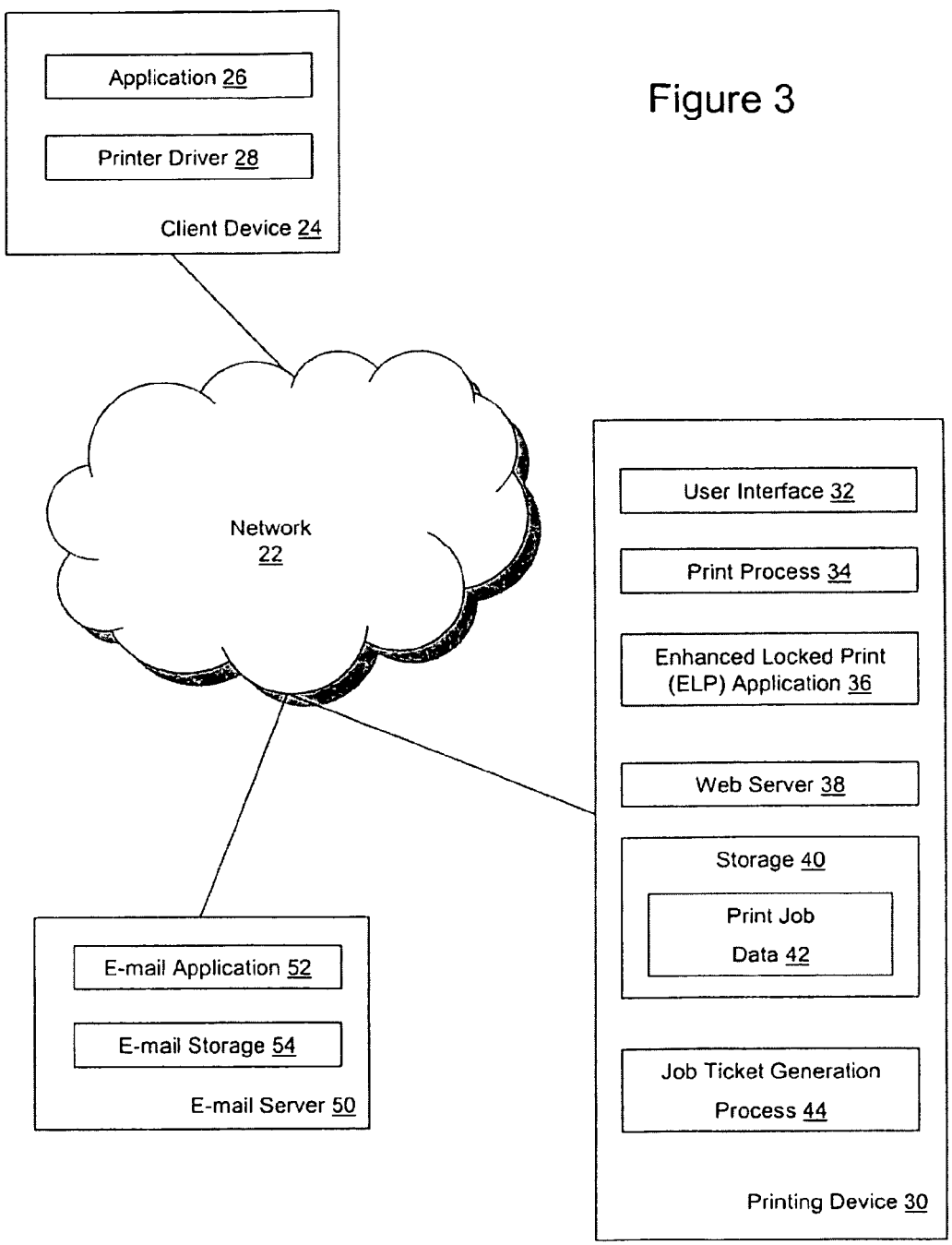
FIG. 3 illustrates the exemplary locked printing system in further detail.

FIG. 3 illustrates an exemplary network structure including components of the client device 24, the printing device 30, and the e-mail server 50. As illustrated in FIG. 3, the client device 24, the printing device 30, and the e-mail server 50 are connected to each other over the network 22, such as a Local Area Network (LAN), Wide Area Network (WAN), or Wireless Local Area Network (WLAN). It is noted that the client device 24, the printing device 30, and the e-mail server 50 need not be connected to each other over the same network, and may, for example, be connected to each other by any combination of different communications paths (e.g., the Internet, a LAN, or mobile network).

The client device 24 may include an application 26 and a printer driver 28. Application 26 may be any type of application executed on the client device 24. The application 26 may include one or a combination of, for example, a word processing application, spreadsheet application, e-mail client, web browser, portable document format (PDF) viewer, image viewing/editing software, or any other application configured to generate data for processing by the printing device 30. The printer driver 28 is configured to provide a user interface to set up the locked printing, as further discussed below. Further the printer driver 28 is configured to process the data from the application 26 and generate print data that is provided to the printing device 30 for processing. The client device 24 may display user interfaces such as those illustrated in FIGS. 9A-9C, as discussed below.

The printing device 30 may include a user interface 32, a print process 34, an ELP application 36, a web server 38, a storage 40 storing print job data 42, and a job ticket generation process 44. The user interface 32 may be any mechanism and/or medium that provides for the exchange of information between a user and the printing device 30. The print process 34 may be implemented by one or more processes for printing the print job received from the client device 24. The ELP application 36 is an application for processing a locked print job. The web server 38 may be implemented by any mechanism or process for generating Web pages, which allows a user or an administrator to manage, or access information on, the printing device 30. For example, the user or the administrator may access the web server 38 to manage (e.g., release, edit, delete, or add) pending print jobs stored in the printing device 30, and/or to configure the manner in which the printing device 30 processes a locked print request. Further, the user or the administrator may access the web server 38 to retrieve a job log stored on the printing device 30. The storage 40 is configured to store the print job data 42 received from the client device 24. Further, the job ticket generation process 44 generates a job ticket corresponding to the locked print request received from the user, for example, via the client device 24, and forwards the job ticket to the user or any other designated user.

The e-mail server 50 may include an e-mail application 52 and an e-mail storage 54. The e-mail application 52 is installed on the e-mail server 50 and provides e-mail services. The e-mail server 50 may exchange information with the client device 24 and/or the printing device 30 using one or a variety of different protocols. The different protocols may include, for example, the Internet Message Access Protocol (IMAP), Post Office Protocol 3 (POP3), Simple Mail Transfer Protocol (SMTP), or the HTTP protocol. The e-mail storage 54 stores e-mail messages addressed to one or more users.

However, it is noted that the e-mail server 50 is not required in embodiments in which the job ticket is sent via other communication methods, as discussed above. In such embodiments, the e-mail server 50 may be replaced with any suitable server, if necessary, for performing the job ticket transfer in accordance with the one or the combination of other communication methods.

Figure 4:
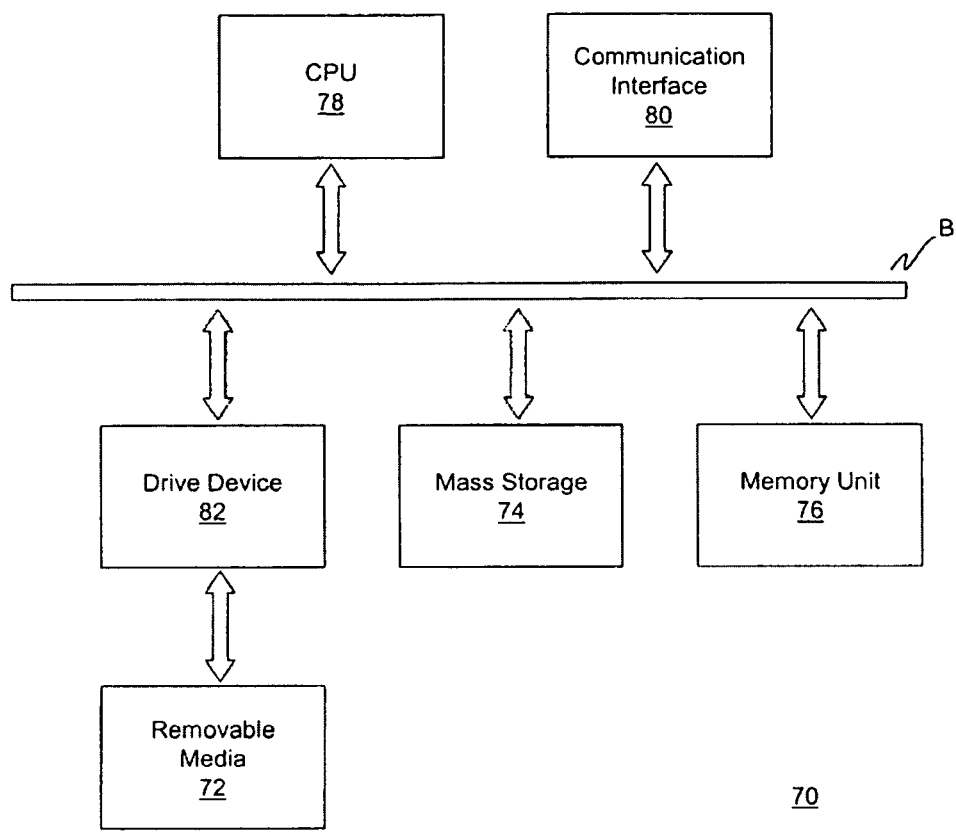
FIG. 4 illustrates hardware components of one embodiment of the client device and the e-mail server.

FIG. 4 illustrates a computer system 70 in which embodiments of the client device 24 and the e-mail server 50 may be implemented. The client device 24 or the e-mail server 50 may be implemented in, for example, workstations, personal computers, laptop computers, personal digital assistants (PDAs), cellular telephone devices, or other mobile devices. The computer system 70 includes a bus B or other communication mechanism for communicating information such as address information and data, and a processor/CPU 78 coupled with the bus B for processing the information. The computer system 70 also includes a main memory/memory unit 76, such as a random access memory (RAM) or other dynamic storage device (e.g., dynamic RAM (DRAM), static RAM (SRAM), and synchronous DRAM (SDRAM)), coupled to the bus B for storing information and instructions to be executed by the CPU 78. In addition, the memory unit 76 may be used for storing temporary variables or other intermediate information during the execution of instructions by the CPU 78. The computer system 70 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 78.

The computer system 70 may also include a disk controller coupled to the bus B to control one or more storage devices for storing information and instructions, such as mass storage 74 which may be a hard disk drive, for example, and drive device 82 (e.g., floppy disk drive, read-only compact disc drive, read/write compact disc drive, compact disc jukebox, tape drive, flash memory or a flash memory based drive, and removable magneto-optical drive). The storage devices may be added to the computer system 70 using an appropriate device interface (e.g., small computer system interface (SCSI), integrated device electronics (IDE), enhanced-IDE (E-IDE), direct memory access (DMA), or ultra-DMA).

The computer system 70 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) in order to carry out the desired functionality.

The computer system 70 may also include a display controller coupled to the bus B to control a display, such as a cathode ray tube (CRT), organic light emitting diode (OLED) display, liquid crystal display (LCD), or projector, for displaying information to a computer user. The computer system may include input devices, such as a keyboard, pointing device, or touch display, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system 70 performs a portion or all of the processing steps in response to the CPU 78 executing one or more sequences of one or more instructions contained in a memory, such as the memory unit 76. Such instructions may be read into the memory unit 76 from another computer-readable medium, such as the mass storage 74 or a removable media 72. One or more processors in a multi-processing arrangement may also be employed to execute the sequences of instructions contained in the memory unit 76 or the removable media 72. In alternative embodiments, hard-wired circuitry may be used in place of or in combination with software instructions. Thus, embodiments are not limited to any specific combination of hardware circuitry and software.

As stated above, the computer system 70 includes at least one removable media 72, which is a computer-readable medium, or memory for holding instructions programmed according to the teachings described herein and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other storage medium from which a computer can read.

Stored on any one or on a combination of computer-readable media is software for controlling the computer system 70, for driving a device or devices, and for enabling the computer system 70 to interact with a human user. Such software may include, but is not limited to, device drivers, operating systems, development tools, and applications software. Such computer-readable media further includes the computer program product for performing all or a portion (if processing is distributed) of the processing described herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The term "computer-readable medium" as used herein refers to any medium that participates in providing instructions to the CPU 78 for execution. A computer-readable medium may take many forms, including but not limited to, non-volatile media, and volatile media. Non-volatile media includes, for example, optical, magnetic disks, and magneto-optical disks, such as the mass storage 74 or the removable media 72. Volatile media includes dynamic memory, such as the memory unit 76.

Various forms of computer-readable media may be involved in carrying out one or more sequences of one or more instructions to the CPU 78 for execution. For example, the instructions may initially be carried on a magnetic disk of a remote computer. The remote computer can load the instructions remotely into a dynamic memory and send the instructions over a telephone line using a modem. A modem local to the computer system 70 may receive the data on the telephone line and use an infrared transmitter to convert the data to an infrared signal. An infrared detector coupled to the bus B can receive the data carried in the infrared signal and place the data on the bus B. The bus B carries the data to the memory unit 76, from which the CPU 78 retrieves and executes the instructions. The instructions received by the memory unit 76 may optionally be stored on mass storage 74 either before or after execution by the CPU 78.

The computer system 70 also includes a communication interface 80 coupled to the bus B. The communication interface 80 provides a two-way data communication coupling to a network that is connected to, for example, a LAN, or to another communications network such as the Internet. For example, the communication interface 80 may be a network interface card to attach to any packet switched LAN. As another example, the communication interface 80 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 80 sends and receives electrical, electromagnetic, or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, CAT 6 cable, coaxial cable, optical fiber, etc). The signals through the various networks and the signals on the network and through the communication interface 80, which carry the digital data to and from the computer system 70, may be implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 70 can transmit and receive data, including program code, through the network and the communication interface 80. Moreover, the network may provide a connection to a mobile device such as a personal digital assistant (PDA) laptop computer, or cellular telephone.

Alternatively, the client device 24 may be implemented in a digital copier/printer multi-function machine (MFP), as further discussed below. For example, the client device 24 may capture an image, which is transmitted to the printing device 30 for outputting.

Figure 5A:
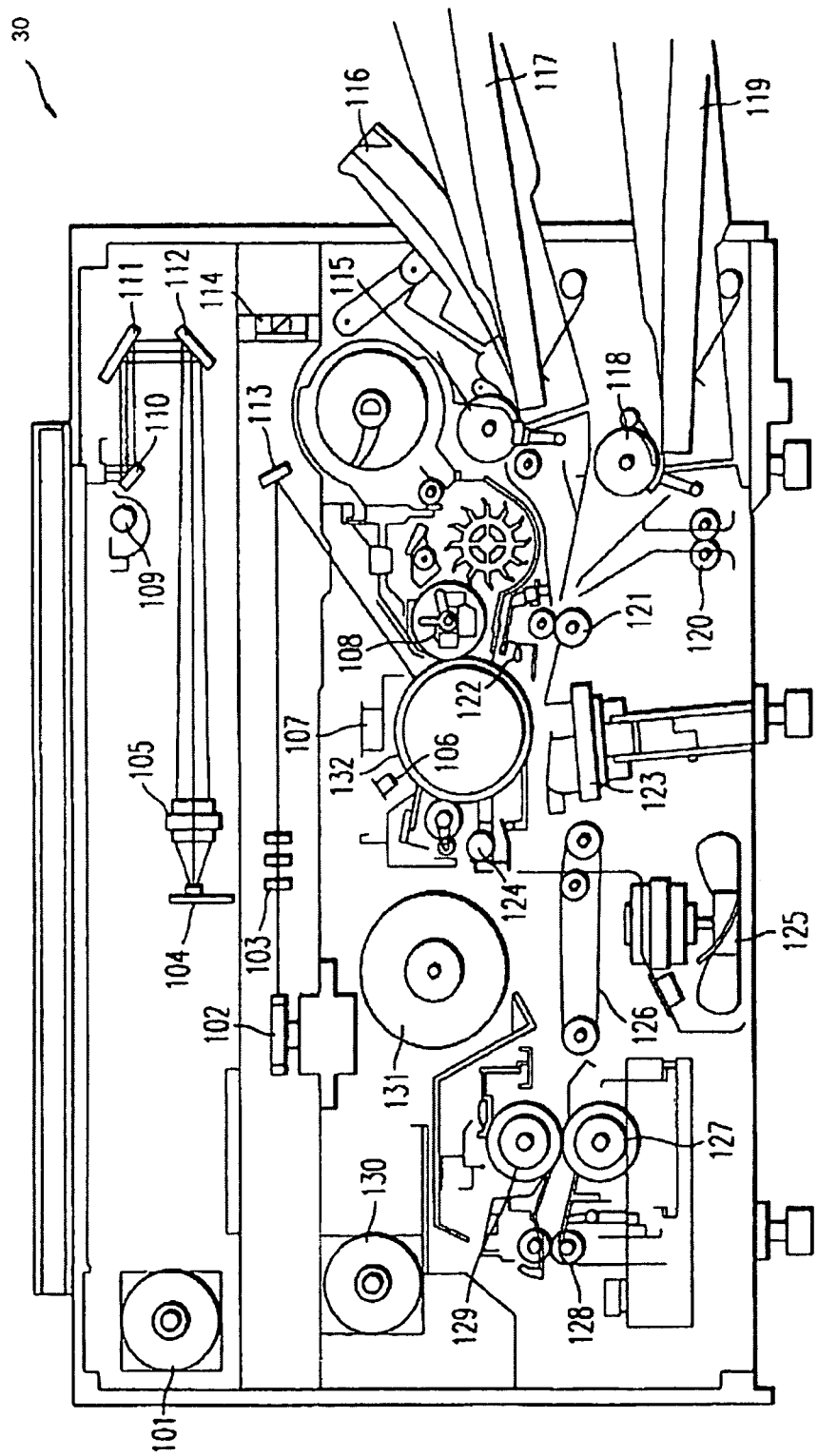
FIG. 5A illustrates hardware components of an exemplary printing device.

FIG. 5A illustrates an exemplary mechanical layout of the printing device 30 illustrated in FIG. 2, which may correspond to a digital copier/printer multi-function machine (MFP). In FIG. 5A, 101 is a fan for the scanner, 102 is a polygon mirror used with a laser printer, and 103 designates an F theta lens used to collimate light from a laser. Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the printing device 30, and 115 is a first paper feed roller used for feeding paper from the first paper cassette 117, and 116 is a manual feed table. Similarly, element 118 is a second paper feed roller for the second cassette 119. Reference numeral 120 designates a relay roller, 121 is a registration roller, 122 is an image density sensor, and 123 is a transfer/separation corona unit. Reference numeral 124 is a cleaning unit, 125 is a vacuum fan, element 126 is a transport belt, 127 is a pressure roller, and 128 is an exit roller. Reference numeral 129 is a hot roller used to fix toner onto the paper, 130 is an exhaust fan, and 131 is the main motor used to drive the digital copier/printer multi-function machine.

Figure 5B:
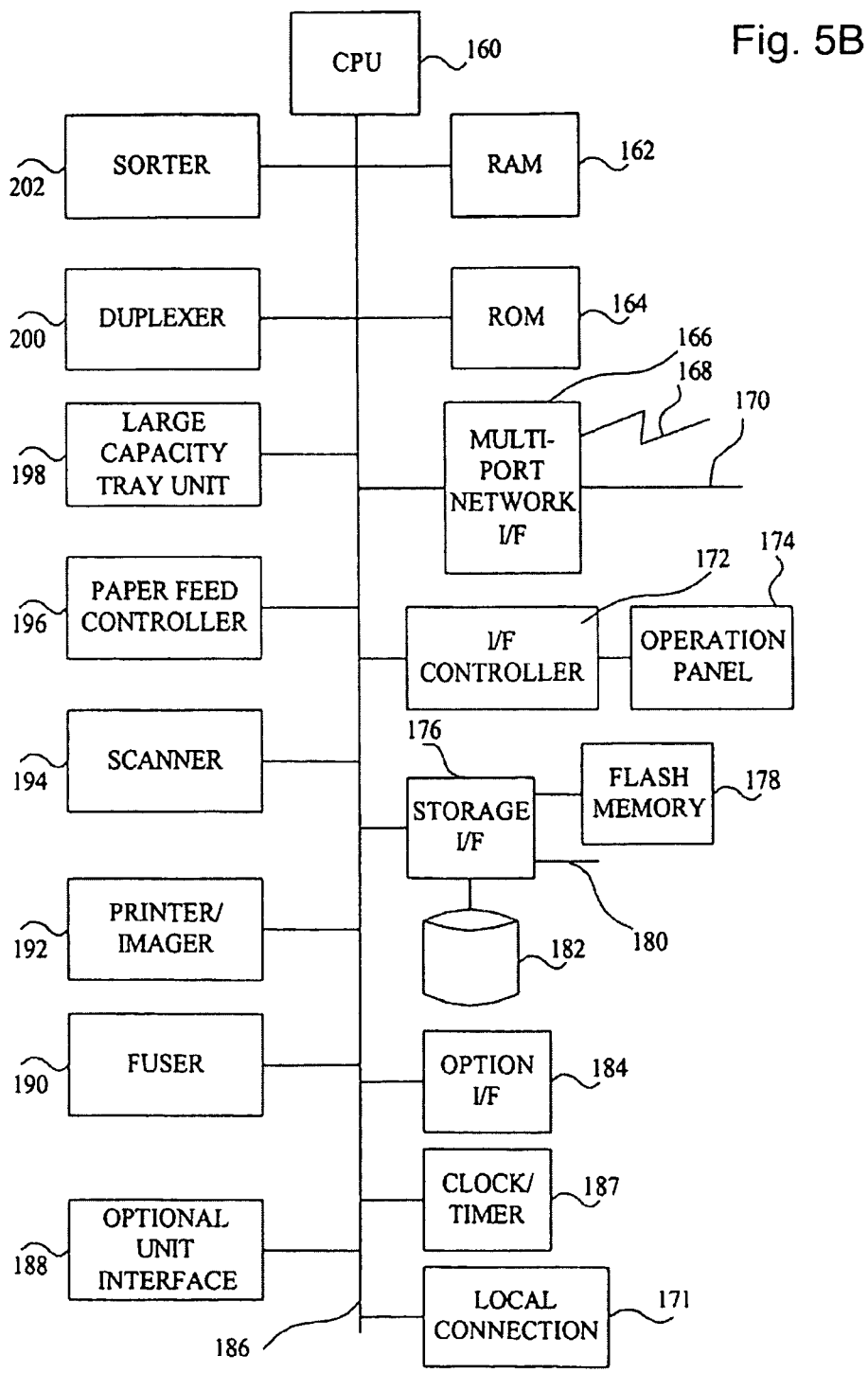
FIG. 5B illustrates electronic components of the printing device illustrated in FIG. 5A.

FIG. 5B illustrates a block diagram of the electronic components of the printing device 30 illustrated in FIG. 5A. The CPU 160 is a microprocessor and acts as the system controller. There is a random access memory (RAM) 162 to store dynamically changing information including operating parameters of the digital copiers. A read-only memory (ROM) 164 stores the program code used to run the printing device 30 and also information describing the static-state data such as model number, serial number, and default parameters that would not change over the life of the machine. When the device needs to boot up from either a hard disk or flash memory, the ROM memory 164 stores the boot sequence.

Similar to the computer system 70 discussed above, the printing device 30 may perform a portion of or all processing steps in response to the CPU 160 executing one or more sequences of one or more instructions contained in a memory, such as the ROM 164 or of one of the memory types discussed above with respect to the computer system 70. The instructions may be read into the memory from another computer-readable medium, as discussed above, such as mass storage or removable media. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

There is provided a multi-port communication interface 166, which allows the printing device 30 to communicate with external devices. Reference numeral 168 represents a telephone or other communication line including a wireless channel. Reference number 170 represents a wired communication line, such as a wired telephone or Ethernet connection. Further information of the multi-port communication interface is described with respect to FIG. 5C. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display, or other displays as discussed above, may be included within the operation panel 174 to display parameters and messages of the apparatus. The operation panel also can be a touch panel in which the display and function buttons may change according to the context.

A local connection interface 171 is a connection through a local port such as RS232, USB and IEEE 1394. This interface 171 allows external devices to be attached to the apparatus.

A storage interface 176 connects storage devices to the system bus 186. The storage devices include a flash memory 178 and a disk 182. There is a connection 180 connected to the storage interface 176 which allows for additional memory devices to be connected. The flash memory 178 is used to store semi-static data which describes parameters of the device which infrequently change over the life of the apparatus, including the option configuration, network access parameters, and work group, and also can be used to store dynamic data that describes parameters dynamically changing such as print count. An option interface 184 allows additional option devices to be attached and controlled. A clock/timer 187 is utilized to keep track of both the time and date and also to measure elapsed time.

On the left side of FIG. 5B, the various sections making up the printing device 30 are illustrated. Reference numeral 202 designates a sorter and contains sensors and actuators used to sort the output of the printing device 30. There is a duplexer 200 that allows a duplex operation to be performed and includes conventional sensors and actuators. The printing device 30 includes a large capacity tray unit 198 that allows paper trays holding a large number of sheets to be used. The large capacity tray unit 198 includes conventional sensors and actuators.

A paper feed controller 196 is used to control the operation of feeding paper into and through the printing device 30. A scanner 194 is used to scan images into the printing device 30 and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 192, which prints the output of the printing device 30 and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an optional unit interface 188 used to connect optional units such as an automatic document feeder, a different type of sorter/collator, or other elements that can be added to the printing device 30.

Figure 5C:
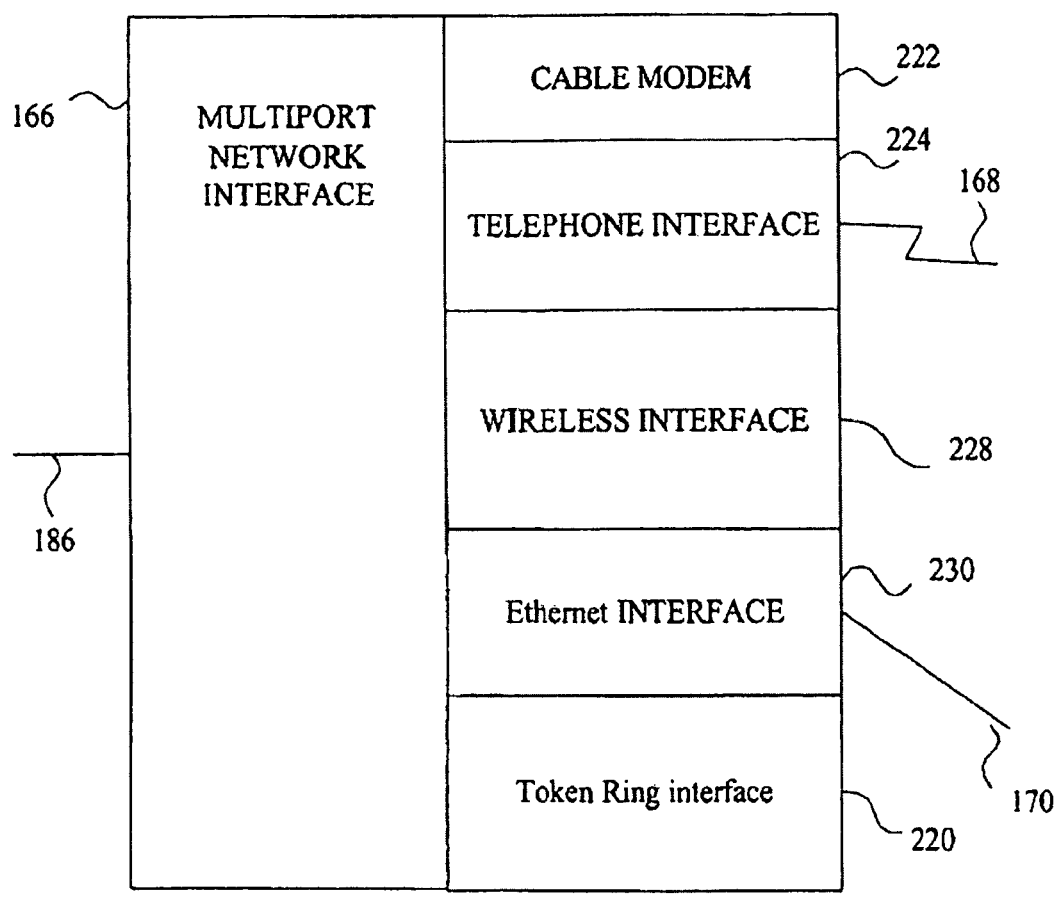
FIG. 5C illustrates details of the multi-port communication interface illustrated in FIG. 5B.

FIG. 5C illustrates details of the multi-port network interface 166. The printing device 30 may communicate to external devices through a Token Ring interface 220, a cable modem unit 222 that has a high speed connection over cable, a conventional telephone interface 224 that connects to a telephone line 168, a wireless interface 228, and an Ethernet interface 230. Other interfaces (not shown) include, but are not limited to, a Digital Subscriber line. The multi-port network interface does not need to have all the interfaces described in FIG. 5C.

The CPU or other microprocessor or circuitry executes a monitoring process to monitor the state of each of the sensors of the printing device 30, and a sequencing process is used to execute the instructions of the code used to control and operate the printing device 30. Additionally, there is (1) a central system control process executed to control the overall operation of the printing device 30 and (2) a communication process used to assure reliable communication to external devices connected to the printing device 30. The system control process monitors and controls data storage in a static state (e.g., the ROM 164 of FIG. 5B), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine, but this embodiment is equally applicable to other business office machines or devices such as an analog copier, a facsimile machine, a printer, a facsimile server, or other business office machines and business office appliances that are configured to store data for future processing.

Figure 5D:
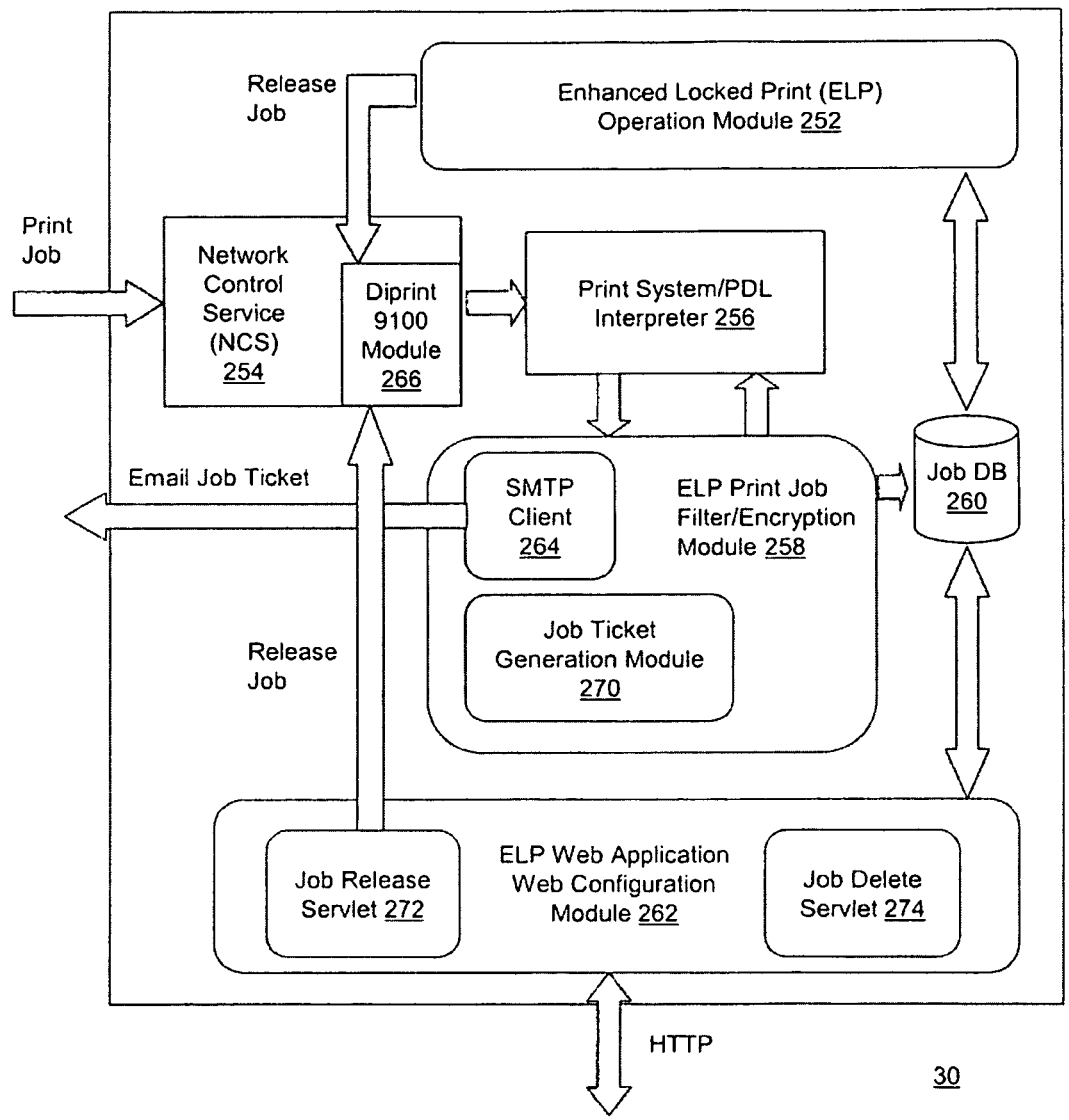
FIG. 5D illustrates an exemplary software application for the printing device.

FIG. 5D illustrates a flow diagram between electronic components in an exemplary embodiment of the printing device 30. As illustrated in FIG. 5D, a network control service (NCS) 254 receives a print job from the printer driver 28 of the client device 24, which is connected to a TCP port of the printing device 30. The print job includes authentication information (e.g., a password, pin code, etc.) generated by the printer driver 28 that is sent as encrypted data to the printing device 30. Alternatively, the print job may include information identifying authentication information previously stored in the printing device 30. The NCS 254 includes Diprint 9100 module 266, which monitors port 9100 for TCP print jobs from the client device 24, and controls communications over the network. However, in alternate embodiments, the Diprint 9100 module 266 may be configured to monitor one or more other port numbers. After receiving the print job, the NCS 254 transfers the print job to print system/printer description language (PDL) interpreter 256, which forwards the print job to the ELP print job filter/encryption module 258.

The ELP print job filter/encryption module 258 determines if the print job has been locked. For example, the print job may include one or more Print Job Language (PJL) or PDL commands/comments that specify locked printing is to be used. If the print job has been locked, the ELP print job filter/encryption module 258 stores the print job in job DB 260. The ELP print job filter/encryption module 258 may optionally encrypt the print job prior to storing the print job in the job DB 260. Further, a job ticket generation module 270 generates a job ticket corresponding to the locked print job. The ELP print job filter/encryption module 258 extracts e-mail information from the print job and sends the extracted e-mail information to an SMTP client 264, which e-mails the job ticket based on the extracted e-mail information. If the ELP print job filter/encryption module 258 determines that the print job is not locked, the ELP print job filter/encryption module 258 returns the print job to the print system/PDL interpreter 256, which interprets print data, e.g., PDL data included in the print job, and prints the print data associated with the print job. In one embodiment, the SMTP client 264 and the job ticket generation module 270 are included in the ELP print job filter/encryption module 258.

Figure 17A:
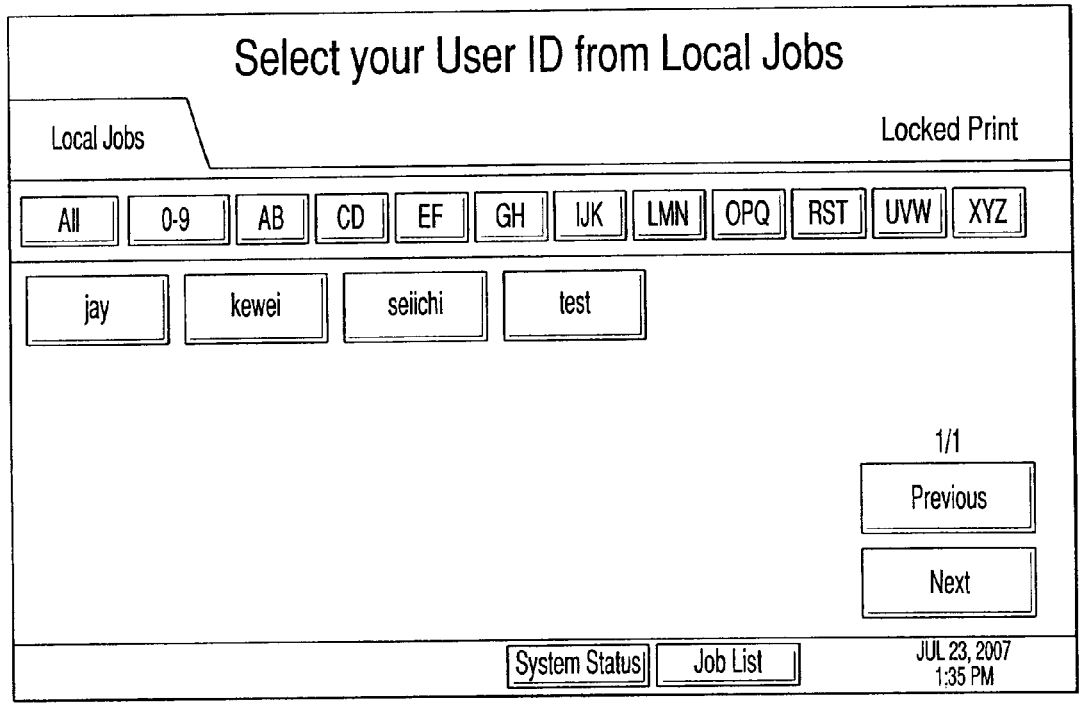
Figure 17B:
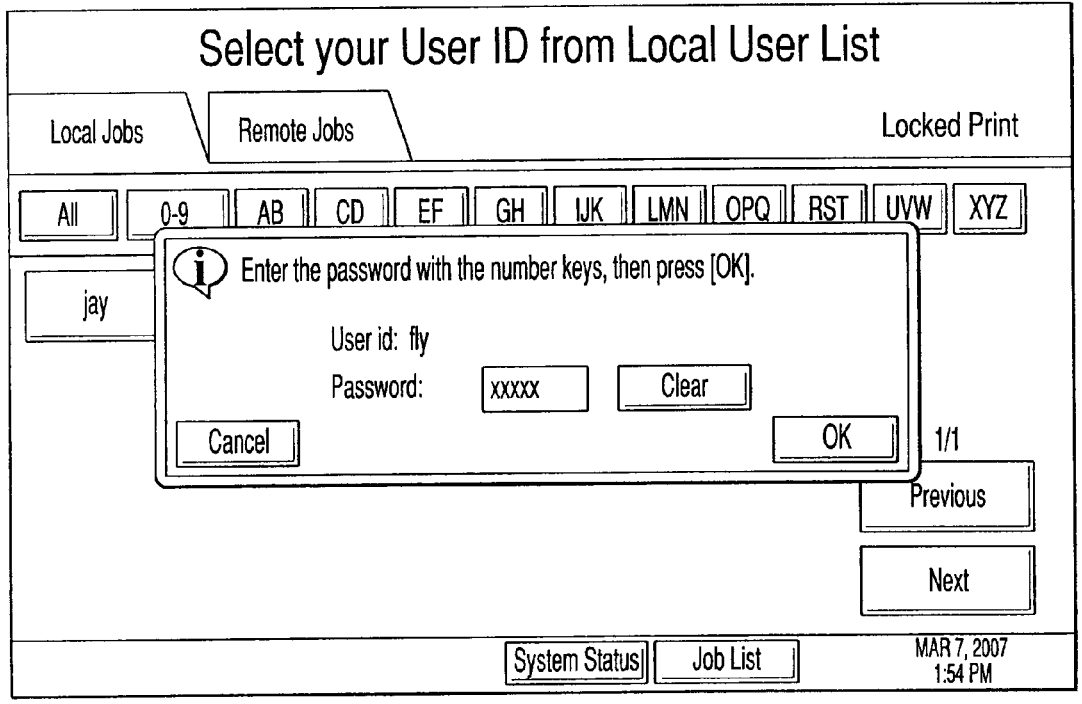

An ELP operation module 252 is configured to provide an interface for a user to access locked print jobs stored in the printing device 30. When the user operates the ELP operation module 252, the user enters a user ID and corresponding authentication information. FIG. 17A illustrates an exemplary interface for the user to select the user ID, and FIG. 17B illustrates an exemplary interface for the user to enter the corresponding authentication information. After the user ID and the authentication information are inputted by the user, the ELP operation module 252 retrieves print jobs associated with the user ID from the job DB 260. The retrieved print jobs are displayed to the user, for example, as illustrated in FIG. 17C. After a particular print job is selected by the user, the ELP operation module 252 pulls the selected print job from the job DB 260 and sends the print job to the Diprint 9100 module 266. The Diprint 9100 module 266 forwards the print job to the print system/PDL interpreter 256, which prints the print data associated with the print job. When, the print system/PDL interpreter 256 is aware that the print job is unlocked, the print job is printed without forwarding to the ELP print job filter/encryption module 258.

The ELP web application web configuration module 262 may connect to a user application or an administrator application using the hypertext transfer protocol (HTTP). However, the user application or the administrator application may connect to the ELP web application web configuration module 262 using other communication protocols such as the file transfer protocol (FTP) or the simple object access protocol (SOAP). The user application or the administrator application may connect to the ELP web application web configuration module 262 to manage (e.g., release, edit, delete, or add) the print jobs stored on the printing device 30, or to access status information such as a job log stored on the printing device 30. In one embodiment, the print jobs may be managed using job release servlet 272 and job delete servlet 274, which may be included in the ELP web application web configuration module 262.

Figure 6:
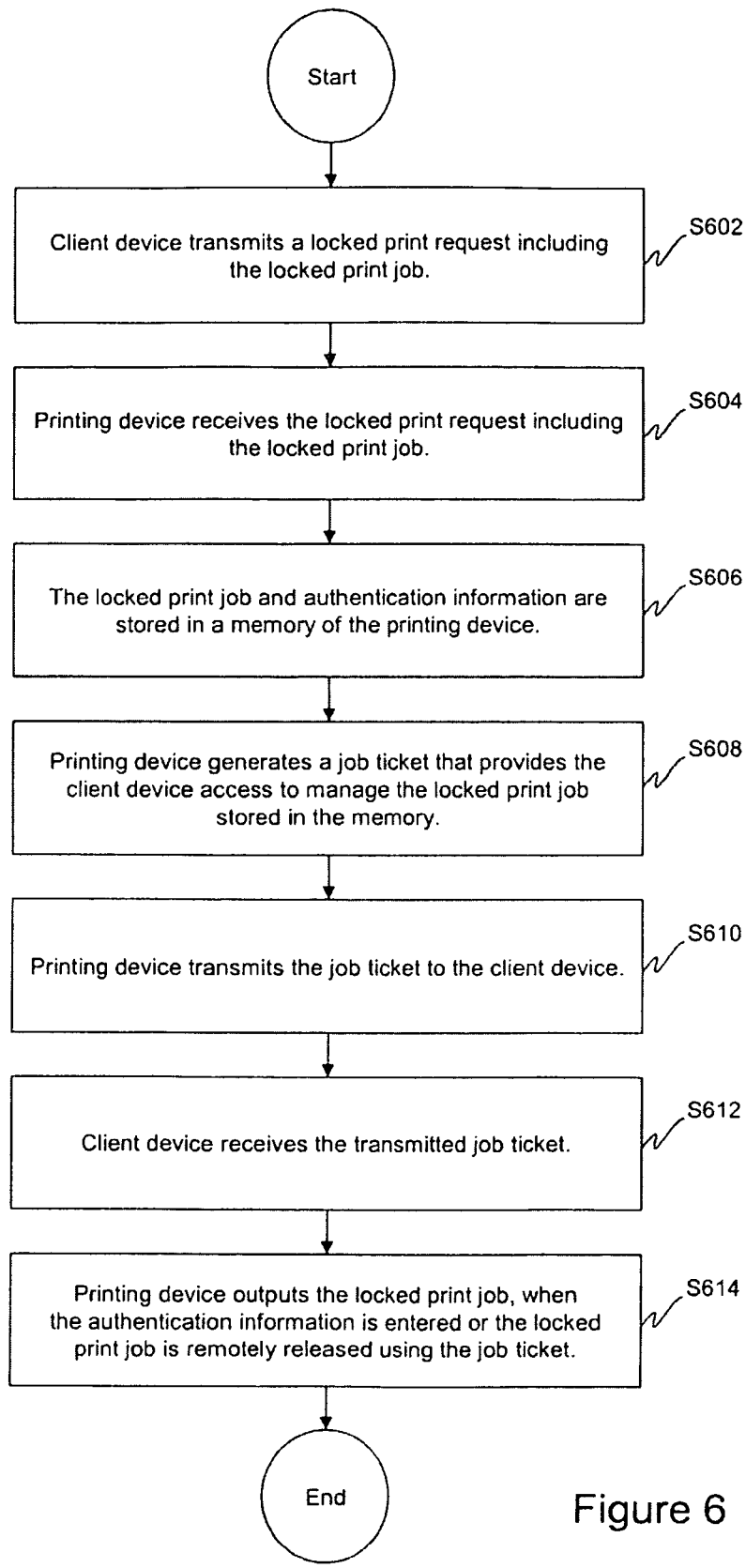
FIG. 6 illustrates a flow diagram of a locked print process including a job ticket according to one embodiment.

FIG. 6 provides an overview of an exemplary process for a locked print process including a job ticket. In step S602, the client device 24 transmits a locked print request including the locked print job to the printing device 30. Authentication information or information identifying predetermined authentication information, which is configured to unlock the locked print job when entered into the printing device 30, may be included in the locked print request. In step S604, the printing device 30 receives the locked print request including the locked print job. The printing device 30 stores the locked print job and the authentication information in a memory that is included in the printing device 30 or that is remotely accessible to the printing device 30, in step S606. The authentication information may be received from the client device 24 or previously stored in the printing device 30.

In step S608, the printing device 30 generates a job ticket that provides a user of the client device 24 access to manage the locked print job stored in the memory. In step S610, the printing device 30 transmits the job ticket to the client device 24. However, the printing device 30 may transmit the job ticket to any other device associated with the user or any other designated user. The client device 24 receives the transmitted job ticket in step S612. In step S614, the printing device 30 outputs the locked print job, when the authentication information is entered into the printing device 30 or the locked print job is remotely released by the user of the client device 24 using the job ticket. The outputting of the print job may include any of printing, forwarding to another device, or faxing. In one embodiment, the inputting of the authentication information may simply allow the user to access the print job stored in the printing device 30. The user may then select an appropriate process to be performed on the print job.

Figure 7:
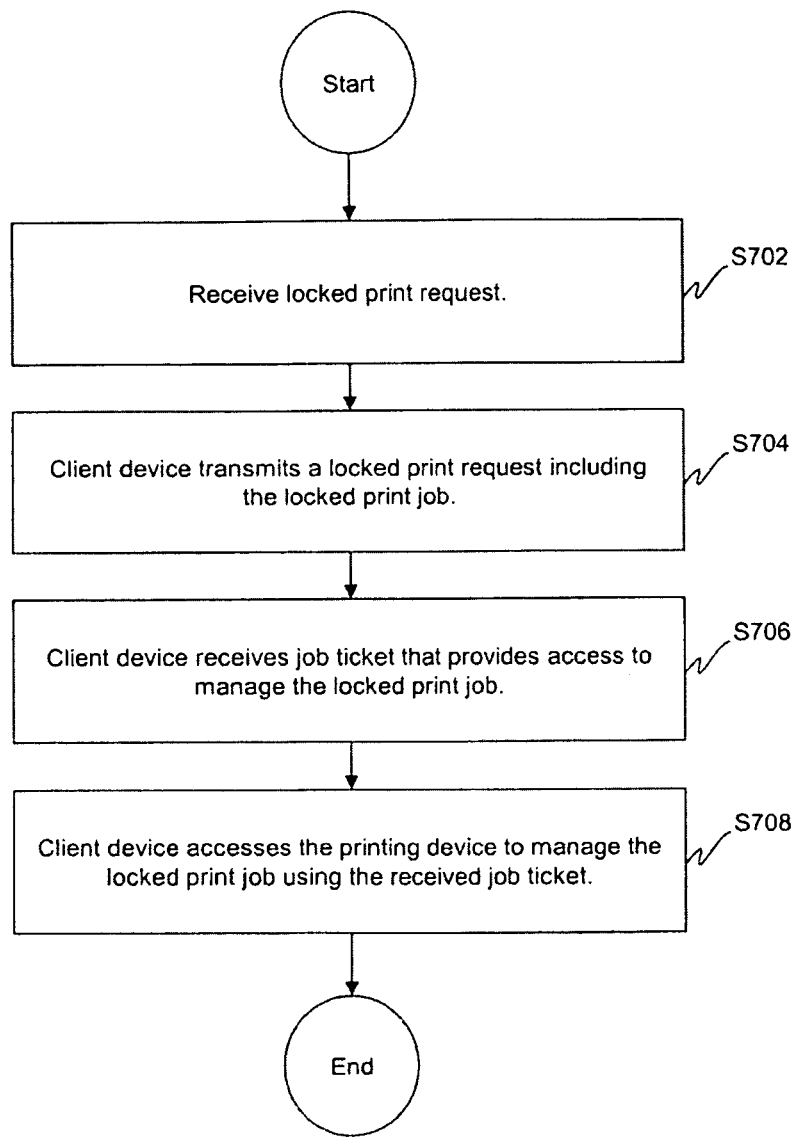
FIG. 7 illustrates a flow diagram of one embodiment of a locked print process including the job ticket performed at the client device.

FIG. 7 illustrates an exemplary process performed by the client device 24 for the locked print process including the job ticket. In step S702, the client device 24 receives a locked print request from a user of the client device 24. The client device 24 generates the locked print request including the locked print job and transmits the locked print request, in step S704. Further, in step S706, the client device 24 receives a job ticket that provides access to manage the locked print job. In step S708, the client device 24 accesses the printing device 30 to manage the locked print job using the received job ticket. For example, the user may use the job ticket to release, edit, delete, or add print jobs on the printing device 30. Although FIG. 7 illustrates that the client device 24 receives the job ticket, in other embodiments the job ticket may be transmitted to another client device of the user or any other designated user.

Figure 8:
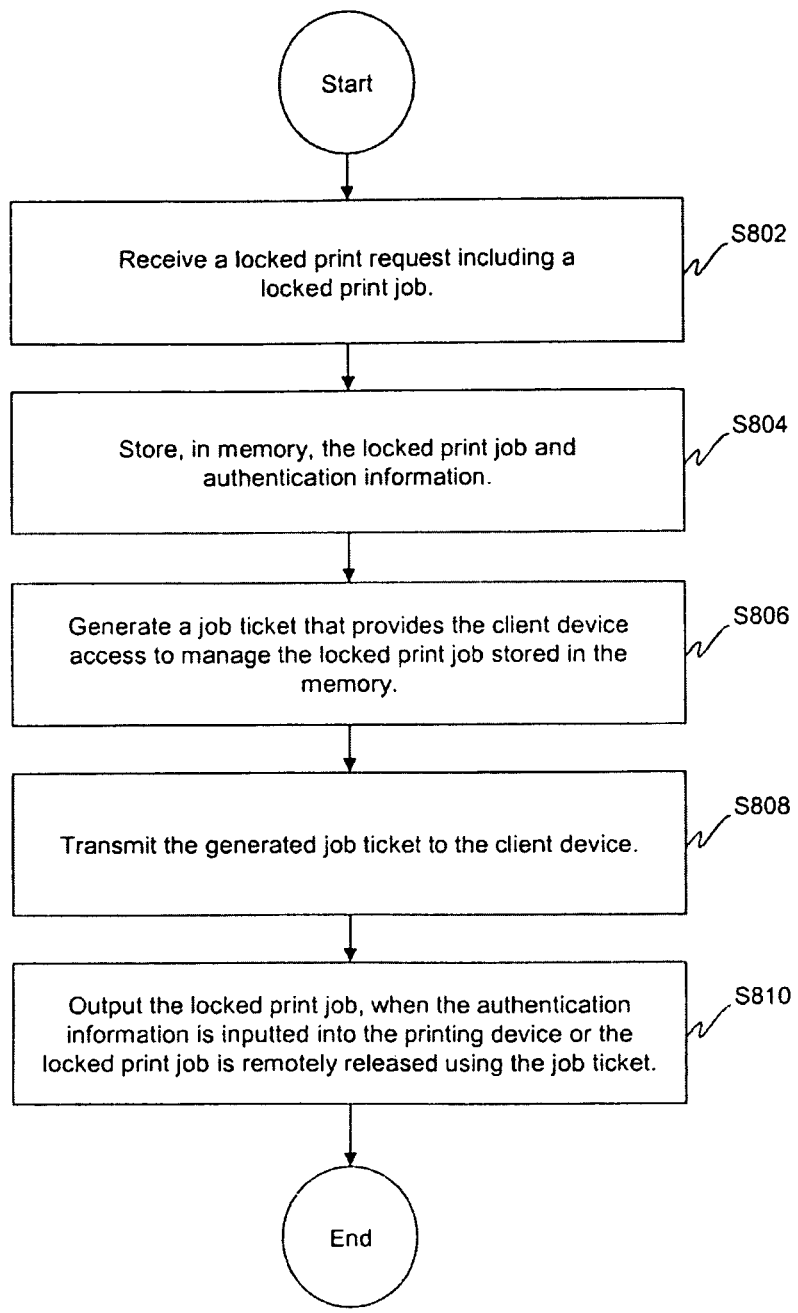
FIG. 8 illustrates a flow diagram of one embodiment of a locked print process including the job ticket performed in the printing device.

FIG. 8 illustrates an exemplary process performed by the printing device 30. As illustrated in FIG. 8, the printing device 30 receives a locked print request including a locked print job, in step S802. In step S804, the printing device 30 stores the locked print job and authentication information in a memory, which is included within the printing device 30 or is remotely accessible to the printing device 30. As noted above, the authentication information may be included in the locked print request or previously stored in the printing device 30. Next, the printing device 30 generates a job ticket that provides the client device 24 access to manage the locked print job stored in the memory. The generated job ticket is transmitted to the client device 24 in step S808. Further, in step S810, the locked print job is outputted, when the authentication information is inputted into the printing device 30 or the locked print job is remotely released by the user of the client device 24 using the job ticket.

Figure 9A:
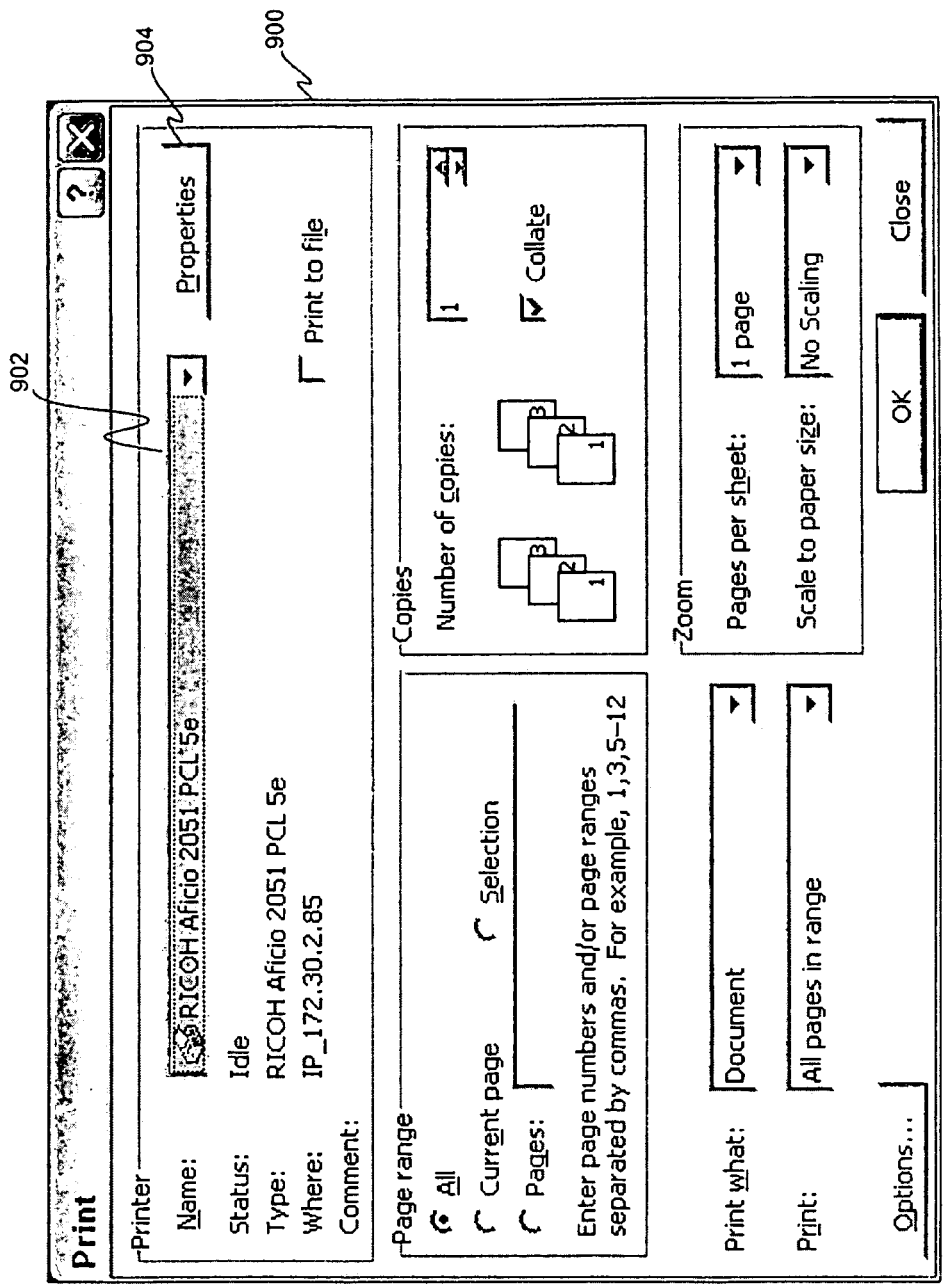
FIGS. 9A-9C are screenshots of exemplary interfaces that may be used to request the locked print job using the client device.
Figure 9B:
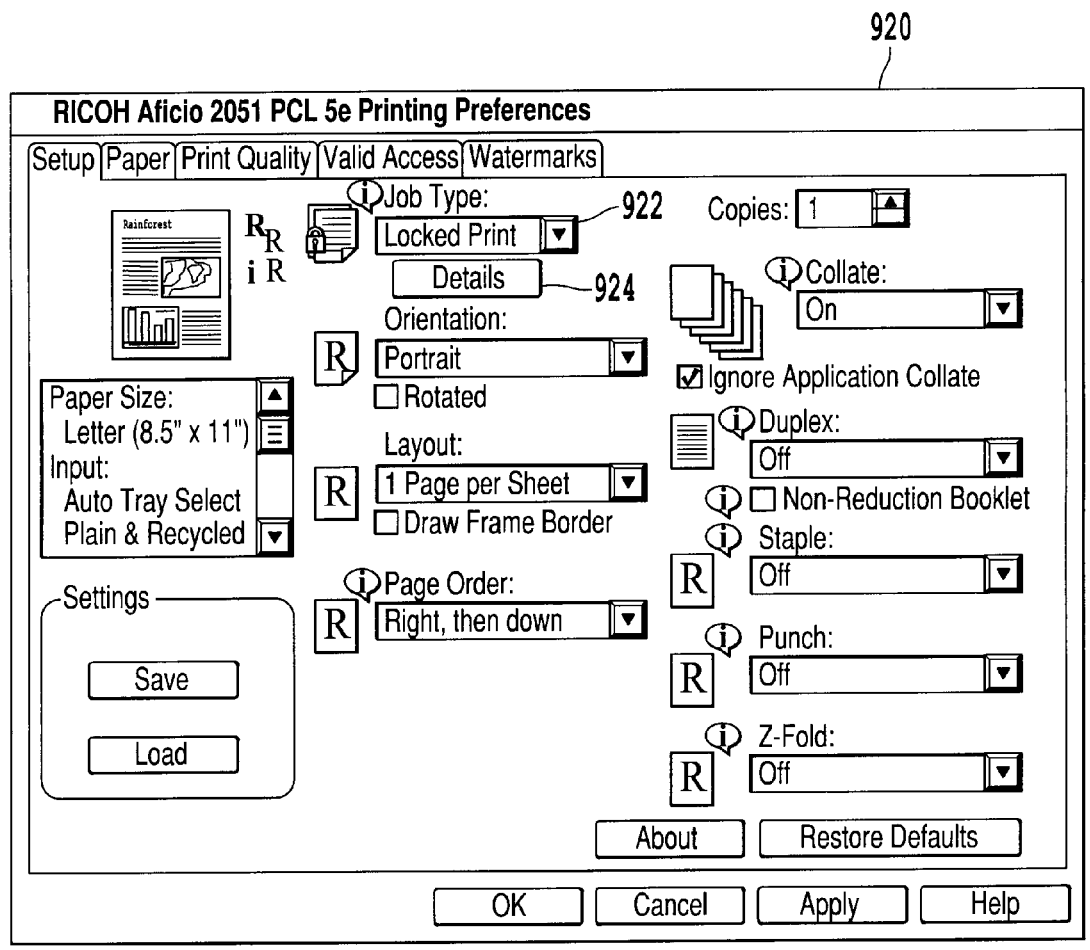
Figures 9C, 10:
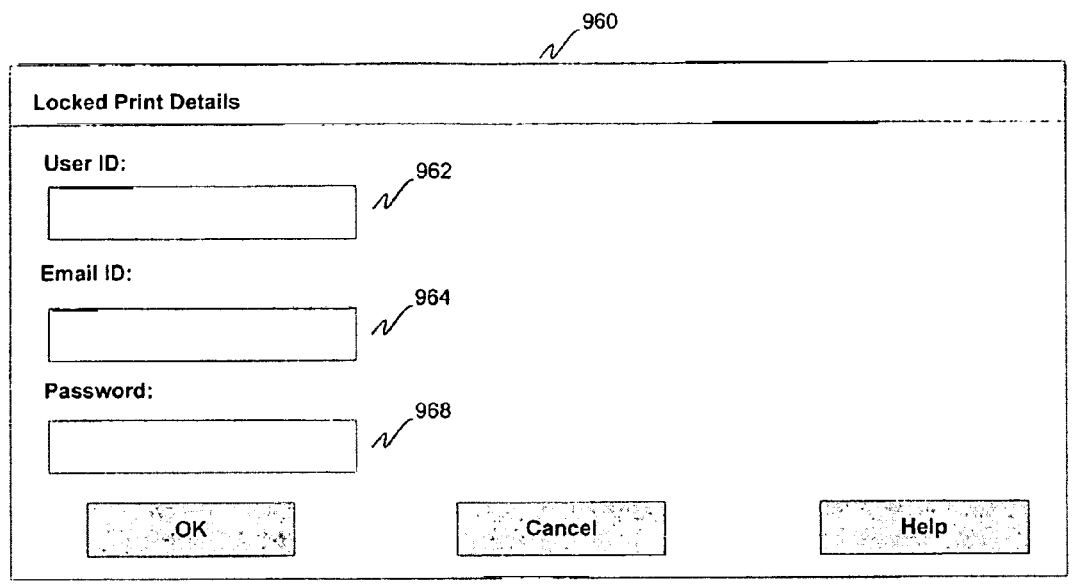
FIG. 10 illustrates exemplary PJL commands/comments corresponding to the locked print job.

FIGS. 9A-9C illustrate exemplary user interfaces for requesting the locked print job. For example, a Print window 900 is displayed to a user of the client device 24. The user selects a printer to process a print job in a drop down window 902. If the user selects the properties button 904, a Printing Preferences window 920, as illustrated in FIG. 9B, is displayed. The Printing Preferences window 920 allows the user to define several printing options, including whether the type of the print job corresponds to a locked or unlocked printing in a drop down window 922. For the locked printing, the user may define further details by, for example, selecting the details button 924. When the user selects the details button 924, a Locked Print Details window 960 is displayed. The Locked Print Details window 960 includes a user ID field 962, an e-mail ID field 964, and a password field 968 for the user to enter user ID, e-mail ID, and password information to be associated with the print job, as illustrated in FIG. 9C. In one embodiment, the user enters his/her own e-mail address in the e-mail ID field 964. However, in another embodiment, the user may enter an e-mail address of any one or a combination of other designated users.

Further, instead of the e-mail ID, other types of information may be used to identify the user or any other designated user including, for example, any one or a combination of telephone numbers, network identifiers, user IDs, group IDs, instant messaging identifiers, look-up table identifiers, or other identifiers that may be used to communicate with the user or the any other designated user. Moreover, the information identifying the user or the any other designated user may be preset in the client device 24 or the printing device 30. When the information identifying the user or the any other designated user is preset in the printing device 30, the information identifying the user or the any other designated user may be replaced with information identifying the user requesting the locked print job.

FIG. 10 illustrates an exemplary set of PJL commands/comments generated by the printer driver 28 for the locked print request. As illustrated in FIG. 10, the PJL comments include information regarding the user ID, e-mail ID, and password information entered by the user, for example in Locked Print Details window 960. The PJL commands/comments are processed by the printing device 30, as discussed with respect to FIG. 11.

Figure 11:
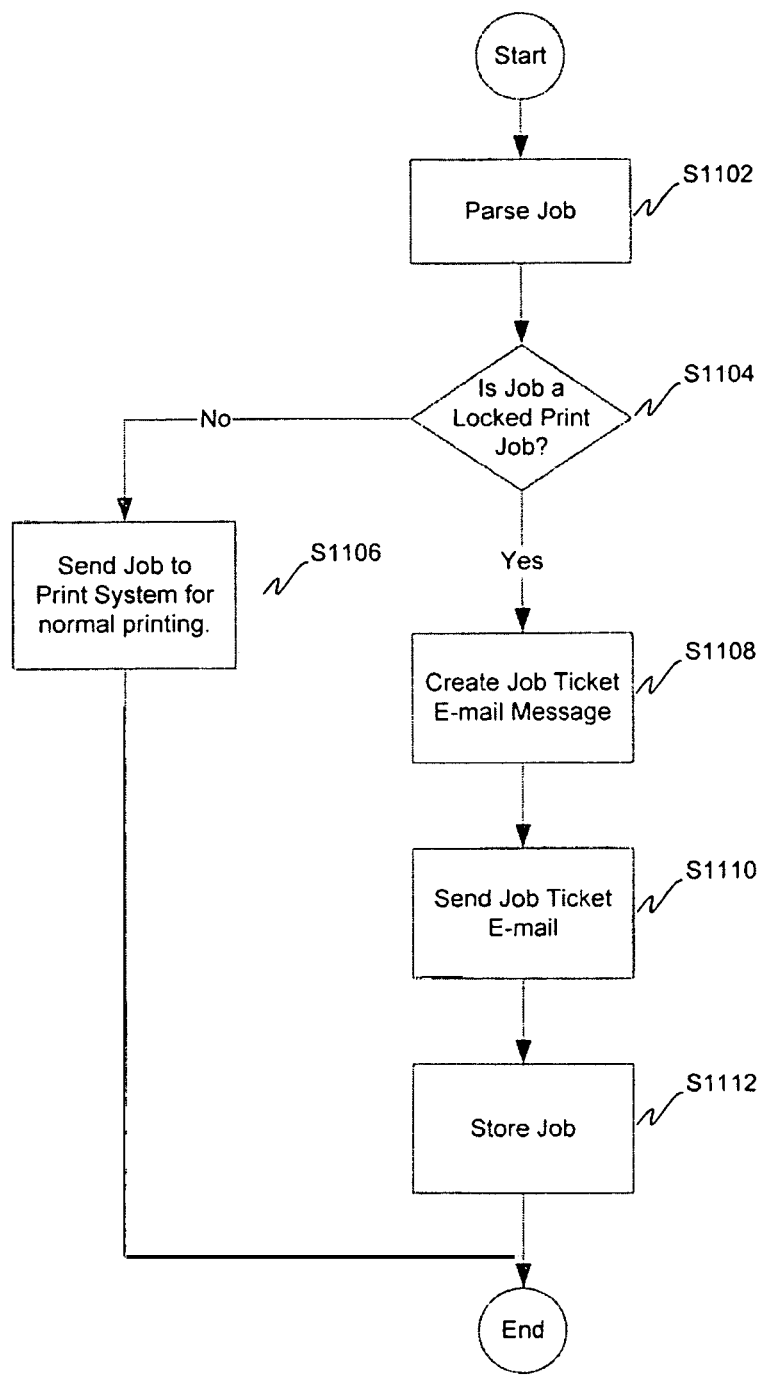
FIG. 11 illustrates an exemplary flow diagram for generating the job ticket.

FIG. 11 illustrates an embodiment for processing a print job received by the printing device 30. The print job may include PJL commands/comments that are generated by the printer driver 28 of the client device 24. An exemplary set of PJL commands/comments generated by the printer driver 28 is illustrated in FIG. 10. As illustrated in FIG. 11, the printing device 30 parses the PJL commands/comments in the print job, in step S1102. In step S1104, the printing device 30 determines if the print job is a locked print job. For example, the print job may include one or more PJL commands that specify locked printing is to be used. Alternatively, the print job may include a predetermined comment (e.g., a predetermined PJL comment). In another embodiment, the locked print job may simply be detected based on the presence of a password.

If the printing device determines that the print job is not of the locked type, the print job is sent to the print system/PDL interpreter 256 for normal printing, in step S1106. However, if the print job is of the locked type, the printing device creates a job ticket e-mail message, in step S1108. In step S1110, the job ticket e-mail is sent to the e-mail address identified by the PJL commands/comments. Further, in step S1112, the locked print job is stored in a memory included in the printing device 30, or a memory that is remotely accessible to the printing device 30.

However, it is noted that the print job need not be stored after parsing the print job in step S1102, and creating and sending the email message in steps S1108 and S1110. Rather, in other embodiments, the print job may be stored before, or at the same time, the print job is parsed, or the e-mail is created and sent. Further, the PJL commands/comments need not include both the user ID and password. Rather, the printing device 30 may parse either one of the user ID and the password from the PJL comments, based on need. Further, the PJL commands/comments need not identify the e-mail address of the recipient of the job ticket. Rather, in other embodiments, the PJL commands/comments may include any information identifying the user or any other designated user, as discussed above.

Figure 12:
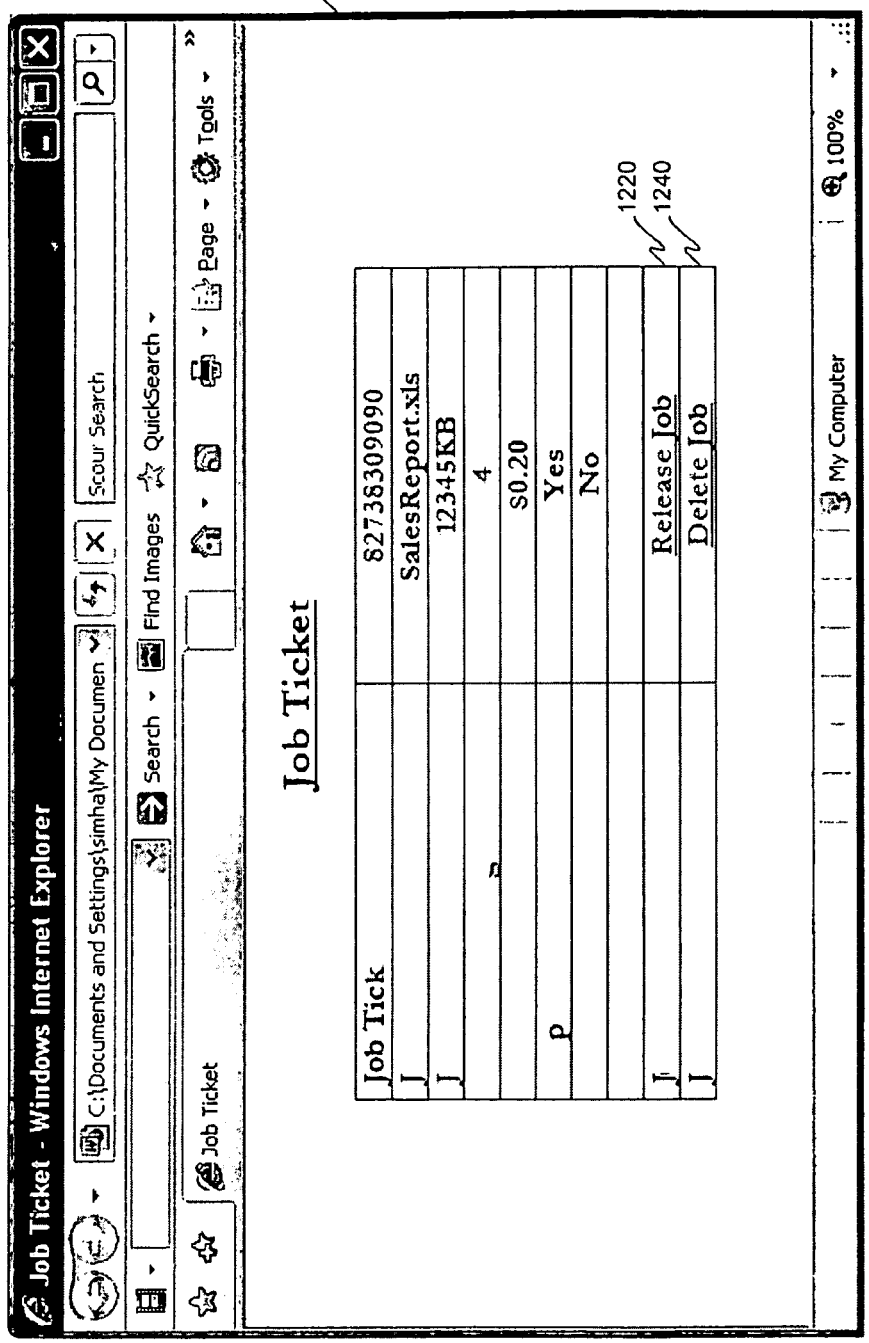
FIG. 12 illustrates an exemplary job ticket.

FIG. 12 illustrates an exemplary job ticket 1200 created by the printing device 30. As illustrated in FIG. 12, the job ticket 1200 may include various information regarding the locked print job. The information may include a job ticket number, a job name, a job size, number of pages, cost, duplex, and color. The job ticket number corresponds to a unique identifier of the print job (e.g., "82738309090"). The job name (e.g., "SalesReport.xls") may be sent from the printer driver 28 as "@PJL JOBNAME". The job size indicates the size of the print job, in any unit such as in Kbytes. The job ticket also includes the cost for printing the locked print job, which may be based on cost per a page information programmed in an ELP application of the client device 24 or the printing device 30. Further, the job ticket includes information regarding whether the print job requires duplex or color printing.

Figure 14A:
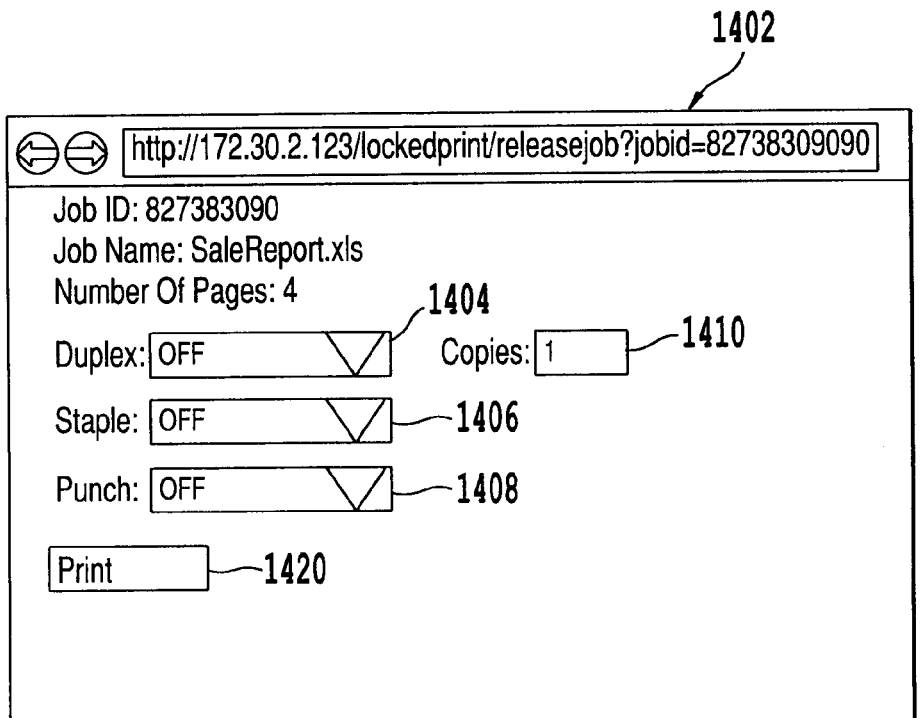
FIGS. 14A and 14B illustrate exemplary job release interfaces.
Figure 16:
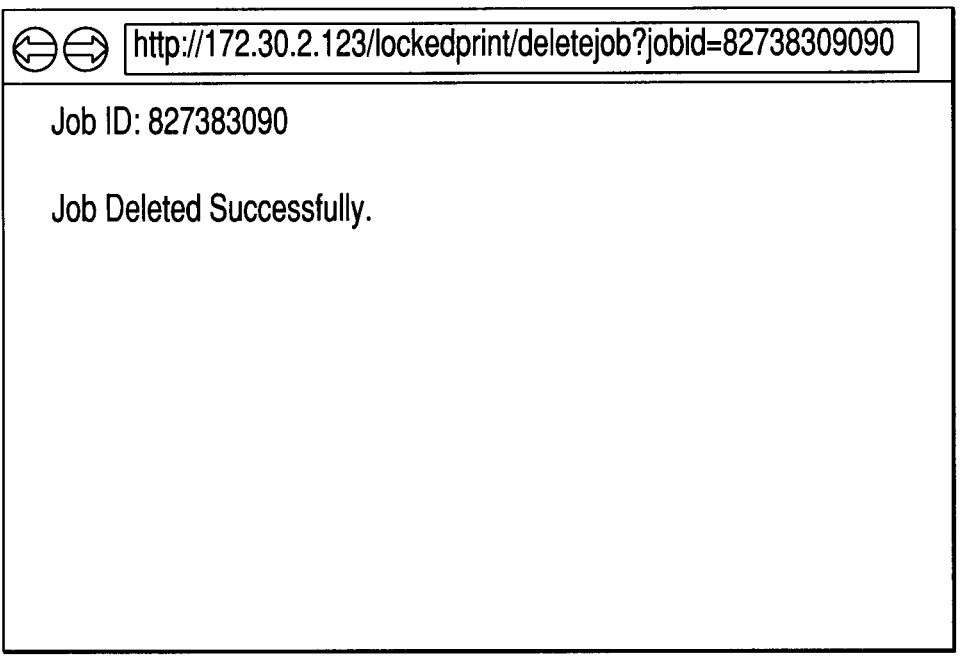
FIG. 16 illustrates an exemplary job delete interface.

The job ticket 1200 further includes hyperlinks (e.g., release job link 1220 and delete job link 1240) for managing the locked print job stored in the printing device 30. When the release job link 1220 is selected, a browser is opened with a link such as http://<ipaddress>/lockedprint/releasejob?jobid=82738309090. An interface with print job control parameter settings, such as the HTML form illustrated in FIG. 14A, is then displayed allowing a user to modify print job control parameters including duplex, staple, punch, number of copies, etc., before printing the stored locked print job. When the delete job link 1240 is selected, a browser is opened with a link such as http://<ipaddress>/lockedprint/deletejob?jobid=82738309090. In response, the results of the print job deletion are displayed in the browser, for example as illustrated in FIG. 16.

However, hyperlinks are not required to manage the locked print job stored in the printing device 30. For example, in another embodiment, a text message may be sent to a designated number, corresponding to the printing device 30. The text message may include a management code such as a print job release code or a print job delete code, when using a text messaging system such as the Short Message Service (SMS). In an alternative embodiment, an instant message may be sent to an instant messaging ID of the corresponding to the printing device 30. A different instant message may be sent to the instant messaging ID for each management function, such as an instant message for releasing the print job and an instant message for deleting the print job.

Figure 13A:
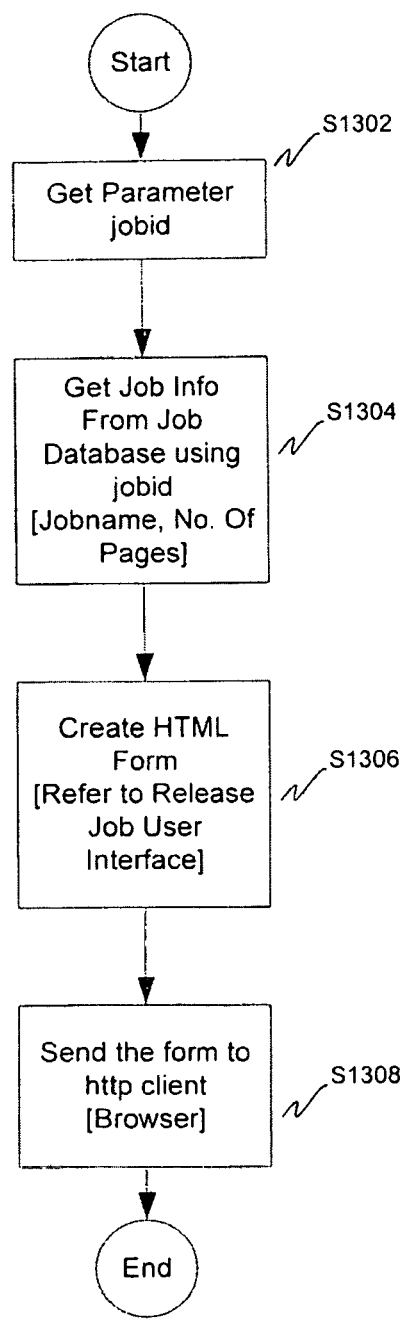
FIGS. 13A and 13B illustrate exemplary flow diagrams of a job release servlet.

FIG. 13A illustrates an exemplary process performed by the job release servlet 272, when a user selects the release job link 1220, illustrated in FIG. 12. In step S1302, the job release servlet 272 retrieves a job ID (e.g., the job ticket number), which may be included in the release job link 1220. In step S1304, the job release servlet 272 retrieves the corresponding print job information from the job database 260. The retrieved print job information may include job name, number of pages, etc. Further, in step S1306, an HTML form is created. An example of the HTML form is illustrated in FIG. 14A. The created HTML form is sent to an http client (e.g., the browser) of the client device 24 in step S1308.

Figure 13B:
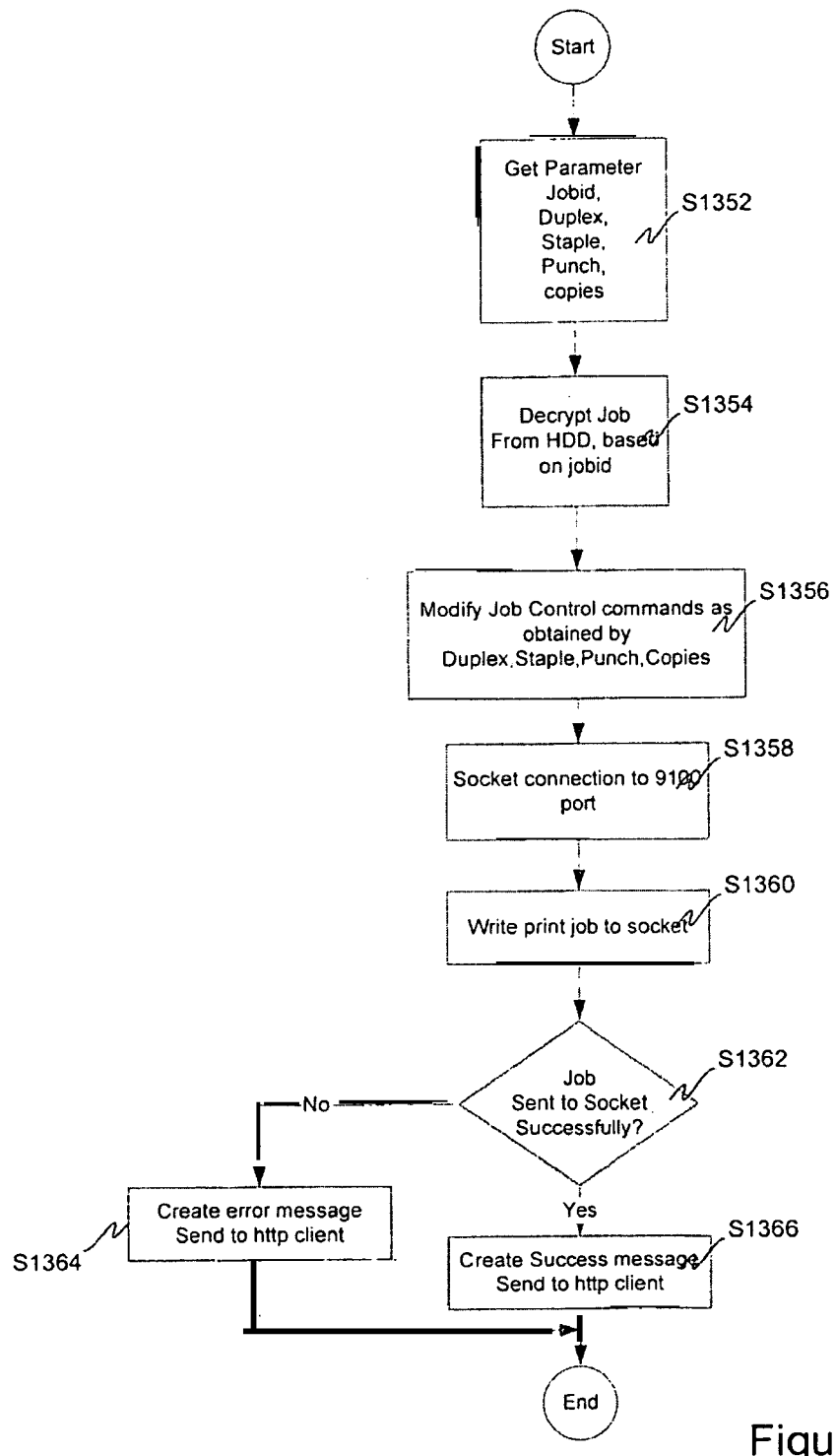

FIG. 13B illustrates an exemplary process performed by the job release servlet 272, when the user requests to print the print job corresponding to the HTML form, for example as illustrated in FIG. 14A. In step S1352, the job release servlet 272 retrieves modified print job control parameters such as duplex, staple, punch, number of copies, etc., from the print request. In step S1354, the print job corresponding to the job ID is retrieved and decrypted (if necessary) from the job database 260. In step S1356, the print job settings of the print job are modified in accordance with the modified print job control parameters received in step S1352. In steps S1358 and S1360, the job release servlet 272 establishes a socket connection to Diprint 9100 module 266 and the print job is written to the socket. In step S1362, a determination is made as to whether the print job was sent to the socket successfully. If the print job was not sent successfully, an error message is created and sent to the http client of the client device 24, in step S1364. If the print job was sent successfully, a success message is created and sent to the http client of the client device 24, in step S1366.

Figure 14B:
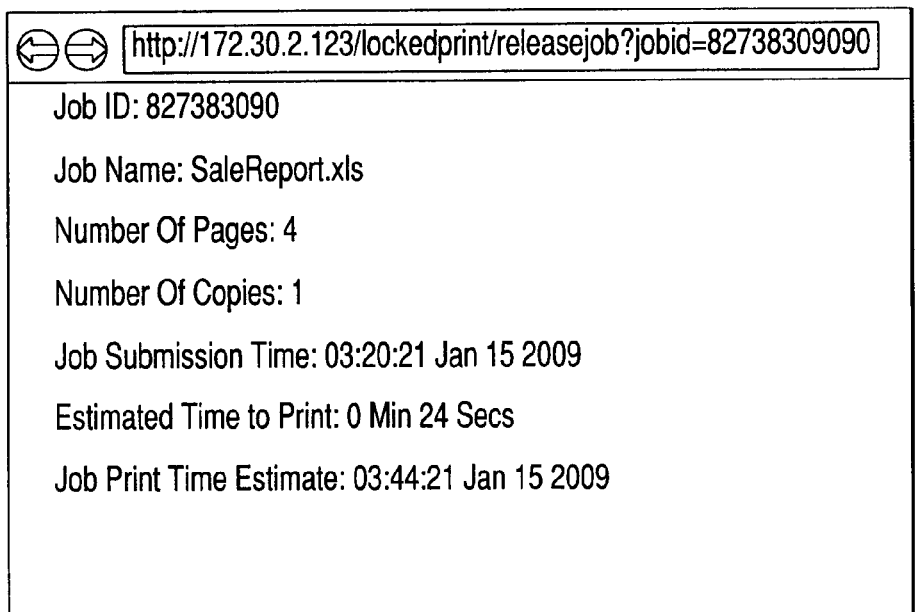

FIGS. 14A and 14B illustrate exemplary release job user interfaces. For example, the user interface of FIG. 14A is displayed, when a user selects the release job link 1220, as discussed above. As illustrated in FIG. 14A, the user is presented with an HTML form 1400 (e.g., a webpage) on the printing device 30. In one embodiment, the HTML form is provided by the ELP web application web configuration module 262. In this form, the user can select print job control parameters such as duplex 1404, staple 1406, punch 1408, number of copies 1410, etc., before printing the print job. Settings selected in this form will override the settings originally sent from the printer driver 28. After the user selects the desired print job control parameters, the user remotely releases the locked print job stored at the printing device 30 by selecting the print button 1420. After the print button 1420 is selected, the desired print job control parameters are posted to the job release servlet 272 running on the printing device 30.

Once the desired print job control parameters are posted to the job release servlet 272, the printing device 30 optionally returns information about the submitted print job. The returned information may include a job submission time, estimated time to complete the print job (i.e., estimated time to print) based on the printing speed of the printing device 30, number of pages in the print job, and number of copies selected. The estimated time to print may be calculated by: Number of Pages*Copies/Pages Per Minute (PPM) specification of the printing device 30. In one embodiment, the returned information may be displayed in an interface as illustrated in FIG. 14B.

Figure 15:
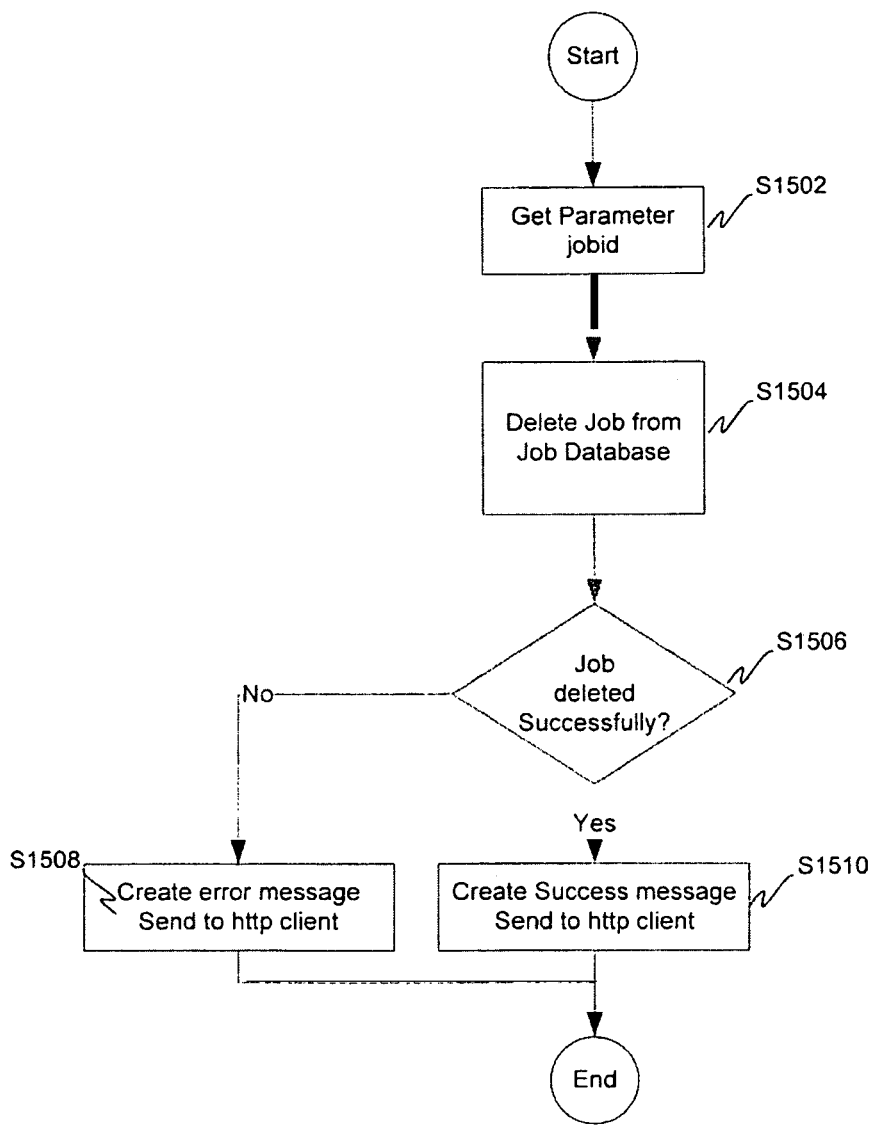
FIG. 15 illustrates an exemplary flow diagram of a job delete servlet.

FIG. 15 illustrates an exemplary process performed by the job delete servlet 274. The job delete servlet 274 may be initiated when a user selects the delete job link 1240 included in the job ticket 1200. In step S1502, the job delete servlet 274 retrieves the job ID of the locked print job corresponding to the delete job link 1240. As noted above, the job ID may be included in the delete job link 1240. The locked print job corresponding to the delete job link is deleted from the job DB 260, in step S1504. In step S1506, the job delete servlet 274 determines if the locked print job was deleted successfully. If the locked print job was not deleted successfully, an error message is created and sent to the http client of the client device 24, in step S1508. If the locked print job was deleted successfully, a success message is created and sent to the http client of the client device 24, in step S1510. The messages may be displayed on an HTML form (e.g., a webpage). An exemplary success message is illustrated in FIG. 16.

FIGS. 17A-17C illustrate exemplary user interfaces for printing a locked print job at the printing device. FIG. 17A illustrates a first user interface in which the user selects a user ID corresponding to the locked print job. After the user ID is selected, the user is prompted to enter a password corresponding to the user ID, as illustrated in FIG. 17B. If a valid password is entered, a list of print jobs corresponding to the user ID is displayed. An exemplary list of the print jobs is illustrated in FIG. 17C.

FIG. 18 illustrates an exemplary locked print job database schema. As illustrated in FIG. 18, a job table includes a primary key that uniquely identifies a print job in the job table. The primary key may correspond to a job ID or job identification number. The job table further includes information defining user ID, a password, a time stamp, a job name, a page count, and a print count for each print job stored in the printing device 30.

Numerous modifications and variations of the present invention are possible in light of the above teachings. It is therefore to be understood that within the scope of the appended claims, the invention may be practiced otherwise than as specifically described herein.

The invention claimed is:

1. A method for outputting a locked print job by a printing device connected to a client device over a network, comprising:
   transmitting a request to print the locked print job, the locked print job including print data that is prohibited from being printed until authentication information is entered into the printing device or the locked print job is remotely released by the client device using a job ticket;
   receiving, by the printing device, the request to print the locked print job;
   storing, in a memory, the locked print job and the authentication information, the authentication information being configured to unlock the locked print job when entered into the printing device;
   generating, by the printing device, the job ticket that provides the client device access to manage the locked print job stored in the memory;
   transmitting the generated job ticket to the client device;
   receiving, by the client device, the transmitted job ticket;
   outputting, by the printing device, the locked print job when the authentication information is entered into the printing device; and
   outputting, by the printing device, the locked print job when the locked print job is remotely released by the client device using the job ticket and without entry of the authentication information.

2. The method of claim 1, further comprising:
   accessing the printing device, by the client device, to remotely release the locked print job using the received job ticket.

3. The method of claim 1, wherein the generating step comprises generating the job ticket that provides the client device access to modify print parameters of the locked print job stored in the printing device.

4. The method of claim 3, wherein the job ticket includes a hyperlink to a user interface provided by the printing device over the network, the user interface providing the client device access to modify the parameters of the locked print job.

5. The method of claim 1, further comprising:
   accessing the printing device, by the client device, to delete the locked print job using the job ticket.

6. The method of claim 1, wherein the generating step comprises generating the job ticket that includes a cost estimate for printing the locked print job.

7. The method of claim 1, wherein the transmitting step comprises sending an e-mail including the job ticket to the client device based on a destination included in the locked print job.

8. The method of claim 1, wherein the job ticket includes a link to a user interface, provided by the printing device over the network, that provide provides the client device access to manage the locked print job stored in the memory.

9. A method of a printing device for outputting a locked print job, comprising:
   receiving, by the printing device, a request to print the locked print job, the locked print job including print data that is prohibited from being printed until authentication information is entered into the printing device or the locked print job is remotely released by a client device using a job ticket;
   storing, in a memory, the locked print job and the authentication information, the authentication information being configured to unlock the locked print job when entered into the printing device;
   generating the job ticket that provides the client device access to manage the locked print job stored in the memory;
   transmitting the generated job ticket to the client device;
   outputting, by the printing device, the locked print job when the authentication information is entered into the printing device; and
   outputting, by the printing device, the locked print job when the locked print job is remotely released by the client device using the job ticket and without entry of the authentication information.

10. The method of claim 9, further comprising:
    receiving from the client device, by the printing device, a request to remotely release the locked print job using the job ticket.

11. The method of claim 9, wherein the generating step comprises generating the job ticket that provides the client device access to modify print parameters of the locked print job stored in the printing device.

12. The method of claim 9, further comprising:
    deleting, by the printing device, the locked print job, when the printing device receives a request to delete the locked print job from the client device using the job ticket.

13. The method of claim 9, wherein the generating step comprises generating the job ticket that includes a cost estimate for printing the locked print job.

14. The method of claim 9, wherein the transmitting step comprises sending an e-mail including the job ticket to the client device based on a destination included in the locked print job.

15. A printing device, comprising:
    means for receiving a request to print a locked print job, the locked print job including print data that is prohibited from being printed until authentication information is entered into the printing device or the locked print job is remotely released by a client device using a job ticket;
    means for storing, in a memory, the locked print job and the authentication information, the authentication information being configured to unlock the locked print job when entered into the printing device;

means for generating the job ticket that provides the client device access to manage the locked print job stored in the memory;

means for transmitting the generated job ticket to the client device; and means for outputting the locked print job when the authentication information is entered into the printing device and for outputting the locked print job when the locked print job is remotely released by the client device using the job ticket and without entry of the authentication information.

16. The printing device of claim 15, further comprising:
means for receiving, from the client device, a request to remotely release the locked print job using the job ticket.

17. The printing device of claim 15, wherein the means for generating generates the job ticket that provides the client device access to modify print parameters of the locked print job stored in the printing device.

18. The printing device of claim 15, further comprising:
means for deleting the locked print job, when the printing device receives a request to delete the locked print job from the client device using the job ticket.

19. The printing device of claim 15, wherein the means for generating generates the job ticket that includes a cost estimate for printing the locked print job.

20. The printing device of claim 15, wherein the means for transmitting sends an e-mail including the job ticket to the client device based on a destination included in the locked print job.

* * * * *